(12) United States Patent
Arai et al.

(10) Patent No.: US 8,340,362 B2
(45) Date of Patent: Dec. 25, 2012

(54) IMAGE ACQUISITION APPARATUS AND BIOMETRIC INFORMATION ACQUISITION APPARATUS

(75) Inventors: Shinichi Arai, Ibaraki (JP); Hiroyuki Tsukamoto, Ibaraki (JP); Kiyoharu Kishimoto, Ibaraki (JP)

(73) Assignee: Hitachi Maxell, Ltd., Ibaraka-Shi, Osaka (JP)

( * ) Notice: Subject to any disclaimer, the term of this patent is extended or adjusted under 35 U.S.C. 154(b) by 664 days.

(21) Appl. No.: 12/560,089

(22) Filed: Sep. 15, 2009

(65) Prior Publication Data

US 2010/0067757 A1    Mar. 18, 2010

(30) Foreign Application Priority Data

Sep. 16, 2008  (JP) ................. 2008-236720
Sep. 3, 2009   (JP) ................. 2009-203736

(51) Int. Cl.
*G06K 9/00*        (2006.01)

(52) U.S. Cl. ...................................................... 382/115

(58) Field of Classification Search .................. 382/115
See application file for complete search history.

(56) References Cited

U.S. PATENT DOCUMENTS

| | | | |
|---|---|---|---|
| 2004/0079865 A1* | 4/2004 | Hoshi | 250/214.1 |
| 2006/0257760 A1* | 11/2006 | Mori et al. | 430/7 |
| 2010/0008545 A1* | 1/2010 | Ueki et al. | 382/115 |

FOREIGN PATENT DOCUMENTS

| | | | |
|---|---|---|---|
| JP | 58-140705 A | | 8/1983 |
| JP | 3-157602 A | | 7/1991 |
| JP | 3037941 B2 | | 2/2000 |
| JP | 2003-139947 A | | 5/2003 |
| JP | 2006-162942 A | | 6/2006 |
| JP | 2008-36058 A | | 2/2008 |
| WO | WO2008/062544 | * | 5/2008 |

* cited by examiner

*Primary Examiner* — Tom Y Lu
(74) *Attorney, Agent, or Firm* — Birch, Stewart, Kolasch & Birch, LLP

(57) ABSTRACT

An image acquisition apparatus includes an image pickup device that includes a plurality of pixels, and a filter layer that blocks propagation of an incident light ray which comes from an object side to the pixel side in accordance with an increase in incident angle of the incident light ray.

14 Claims, 23 Drawing Sheets

IMAGE ACQUISITION APPARATUS AND BIOMETRIC INFORMATION ACQUISITION APPARATUS

BACKGROUND OF THE INVENTION

1. Field of the Invention

The present invention relates to an image acquisition apparatus and a biometric information acquisition apparatus.

2. Description of Related Art

With recent enhancement in information security protection, the progress in the technological development relating to biometric authentication has been significant. The biometric authentication is a technique that distinguishes a certain individual from other individuals based on determination as to whether the biometric information acquired from an inspection targeted individual matches previously registered biometric information. Examples of the biometric authentication are identifying an individual based on the iris of a human pupil, identifying an individual based on the vein pattern of a human finger or the like, identifying an individual based on the fingerprint pattern, and so on.

In the biometric authentication, there are various merits and demerits depending on biometric information used for authentication. For example, the biometric authentication using the vein pattern has an advantage that forgery of authentication information is more difficult than the biometric authentication using the fingerprint pattern. On the other hand, the latter has a disadvantage that forgery of authentication information is easier than the former.

In order to achieve highly accurate biometric authentication, it is necessary to acquire a high quality biometric image. For this purpose, it is particularly important to suppress the crosstalk of incident light. In respect of this point, Japanese Unexamined Patent Application Publication No. 3-157602 discloses a technique that places a light shielding spacer between a lens array plate and a sensor. Further, Japanese Unexamined Patent Application Publication No. 2008-36058 discloses a technique that places a light shielding layer between a microlens array and a photoreceptive unit.

Japanese Unexamined Patent Application Publication No. 58-140705 discloses a technique related to a material and a manufacturing method of a dielectric multilayer film filter. Japanese Unexamined Patent Application Publication No. 2003-139947 discloses a technique related to high refractive index and low refractive index materials and a film composition. Japanese Patent No. 3037941 and Japanese Unexamined Patent Application Publication No. 2006-162942 disclose a technique related to formation of a light shielding film and a low reflecting film of a photomask that is used in a photolithography process of semiconductor manufacturing.

In order to acquire a high quality biometric image, it is important to suppress the crosstalk. In order to suppress the crosstalk, it is preferable to use a light shielding structure that effectively separates optical channels corresponding to respective pixels. Such a light shielding structure can be realized by using a light shielding layer that has an opening on an optical axis of a lens. However, there are a variety of causes for the occurrence of stray light, and it is sometimes difficult to effectively suppress the crosstalk with use of the above-described simple light shielding layer.

SUMMARY OF THE INVENTION

The present invention has been accomplished to address the above concern, and an object of the present invention is thus to effectively suppress the crosstalk.

According to an embodiment of the present invention, there is provided an image acquisition apparatus including an image pickup device that includes a plurality of pixels; and a filter layer that blocks propagation of an incident light ray which comes from an object side to the pixel side in accordance with an increase in incident angle of the incident light ray. The filter layer blocks propagation of an incident light ray that comes from the object side to the pixel side in accordance with an increase in incident angle of the incident light ray, and it is thereby possible to effectively suppress the crosstalk.

It is preferred that the image acquisition apparatus further includes a first light shielding layer that has a plurality of openings corresponding to the plurality of pixels. The filter layer blocks propagation of the incident light ray which comes from the object side to the pixel side through the opening in accordance with an increase in incident angle of the light ray.

It is also preferred that the image acquisition apparatus further includes a transparent substrate that supports at least one of the filter layer and the first light shielding layer.

It is also preferred that the image acquisition apparatus further includes a lens array substrate that includes a plurality of lenses corresponding to the plurality of pixels.

It is further preferred that the image acquisition apparatus further includes a second light shielding layer that has a plurality of openings corresponding to the plurality of pixels, and the second light shielding layer is placed immediately above the image pickup device.

The second light shielding layer is preferably formed by a wiring layer of the image pickup device.

The filter layer and the first light shielding layer are preferably placed on the transparent substrate.

Each thickness of the first light shielding layer and the second light shielding layer is preferably substantially uniform in a plane.

It is further preferred that the image acquisition apparatus further includes a third light shielding layer that has a plurality of openings corresponding to the plurality of pixels, and the third light shielding layer is placed between the first light shielding layer and the second light shielding layer with a given space from the first light shielding layer and the second light shielding layer.

A thickness of the third light shielding layer is preferably substantially uniform in a plane.

Each thickness of the first light shielding layer, the second light shielding layer and the third light shielding layer is preferably smaller than a thickness of the transparent substrate.

According to another embodiment of the present invention, there is provided a biometric information acquisition apparatus for acquiring biometric information of a test body, including a light source; an image pickup device that picks up a vein image of the test body by receiving light that is emitted from the light source and made incident on a plurality of pixels thereof through the test body; and a filter layer that blocks propagation of an incident light ray that comes from the test body side to the pixel side in accordance with an increase in incident angle of the incident light ray.

According to the embodiments of the present invention described above, it is possible to effectively suppress the crosstalk.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Exemplary embodiments of the present invention are described hereinafter with reference to the drawings. Each embodiment is simplified for convenience of description. The drawings are given in simplified form by way of illustration only, and thus are not to be considered as limiting the present invention. The drawings are given merely for the purpose of explanation of technological matters, and they do not show the accurate scale or the like of each element shown therein. The same elements are denoted by the same reference symbols, and the redundant explanation is omitted. The terms indicating the directions, such as up, down, left and right, are used on condition that each drawing is viewed from the front.

First Embodiment

Figure 1:
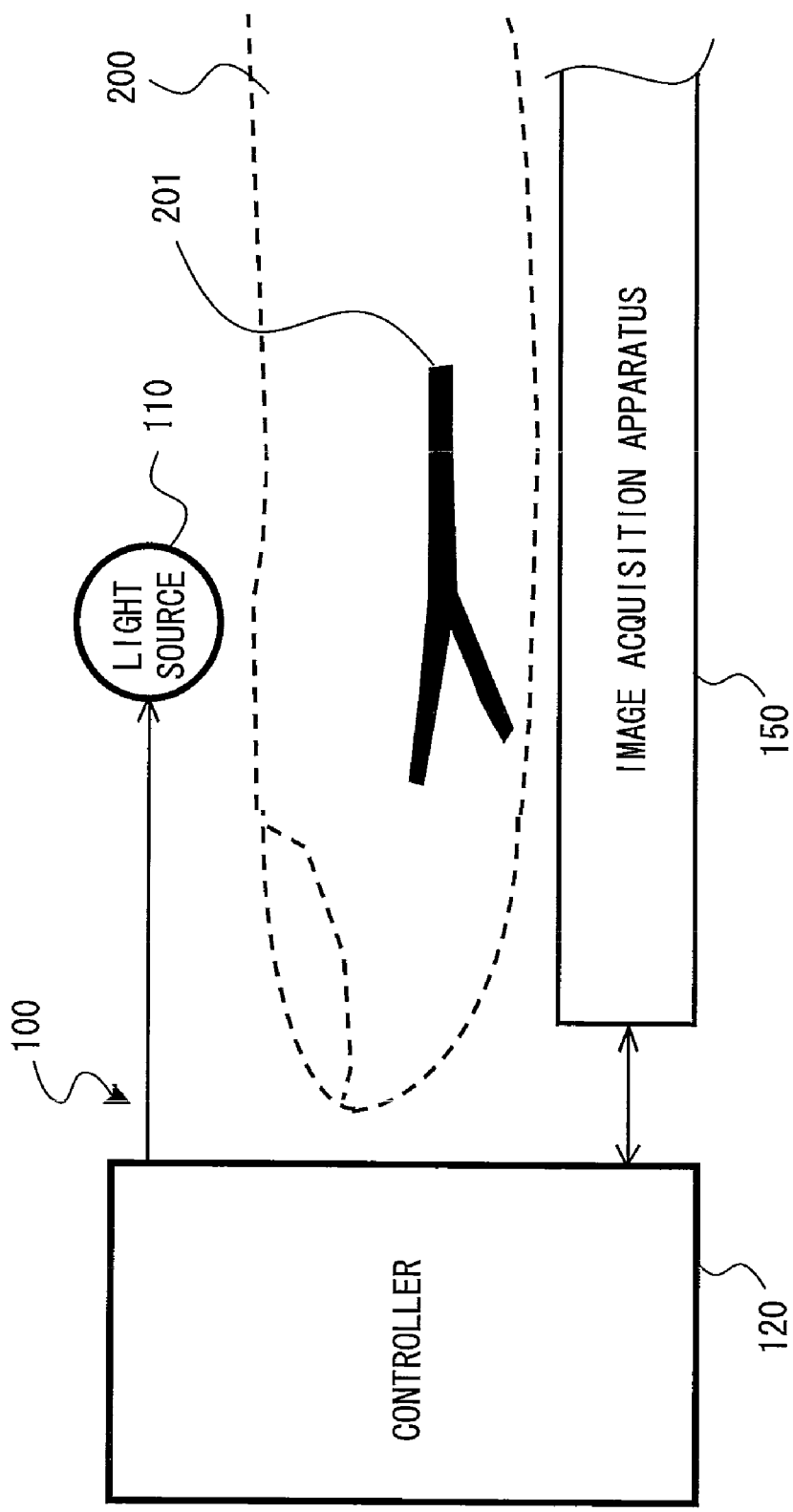
FIG. 1 is an explanatory view showing a schematic structure of a biometric authentication apparatus according to a first embodiment of the present invention.
Figure 2:
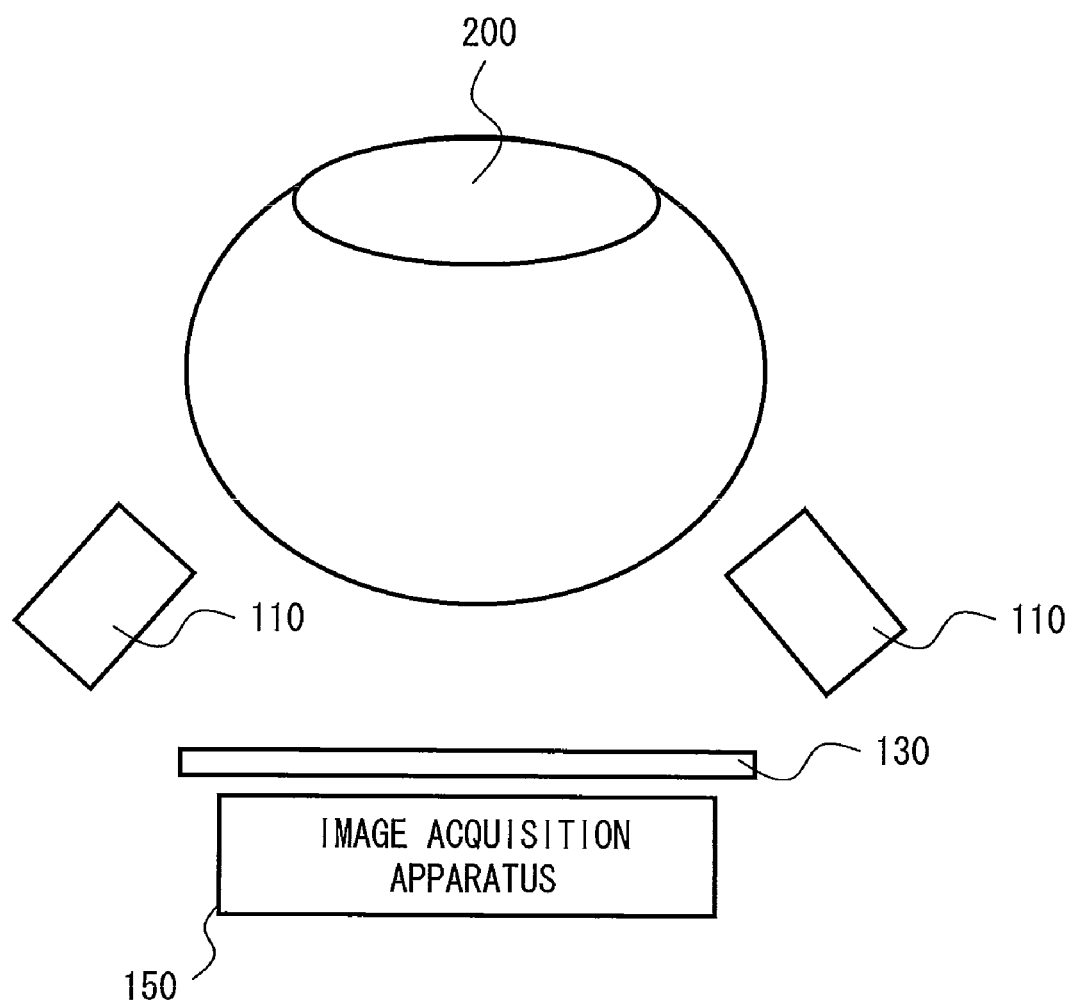
FIG. 2 is an explanatory view showing a schematic structure of a biometric authentication apparatus according to the first embodiment of the present invention.
Figure 3:
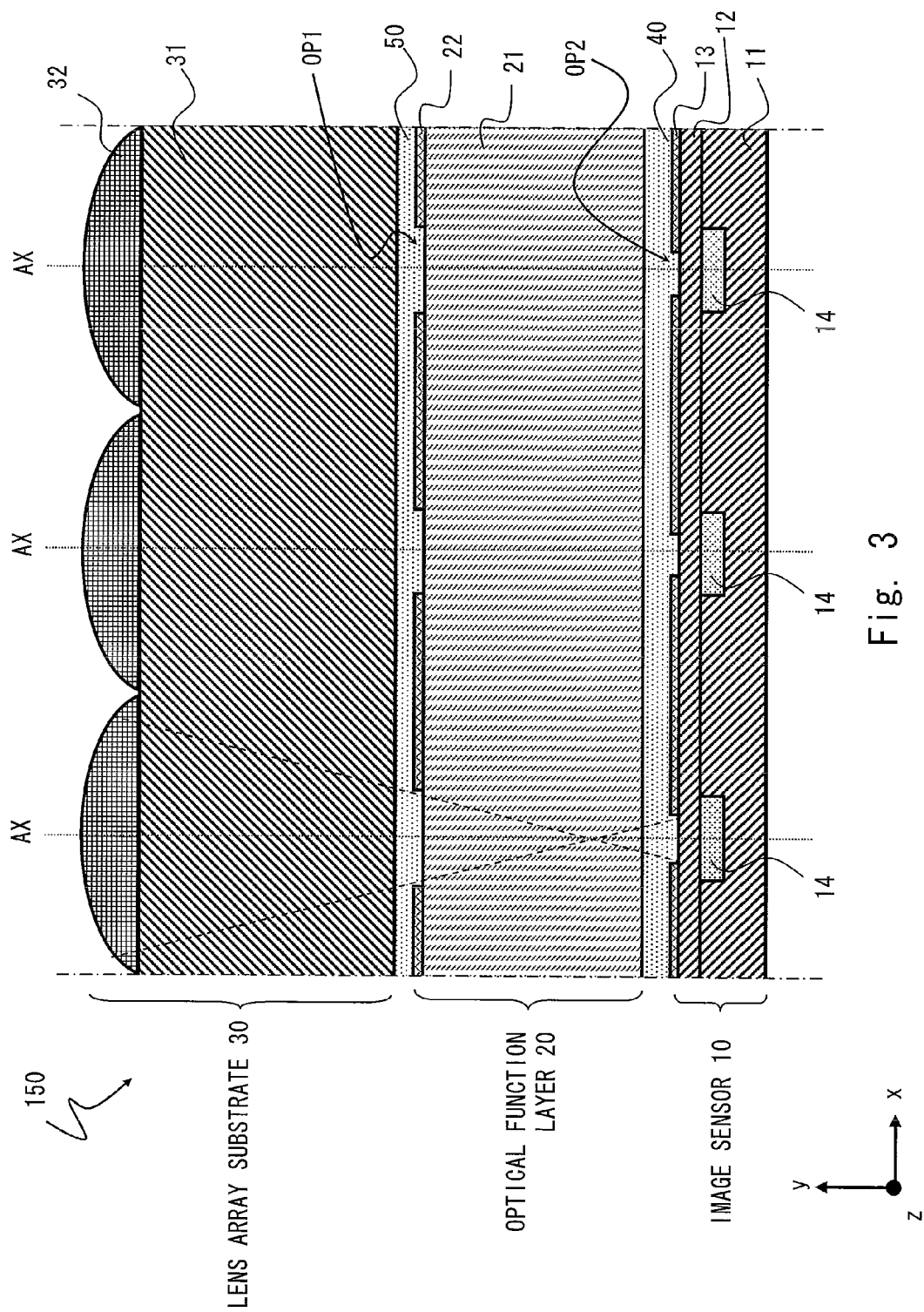
FIG. 3 is a schematic cross-sectional view of an image acquisition apparatus according to the first embodiment of the present invention.
Figure 4:
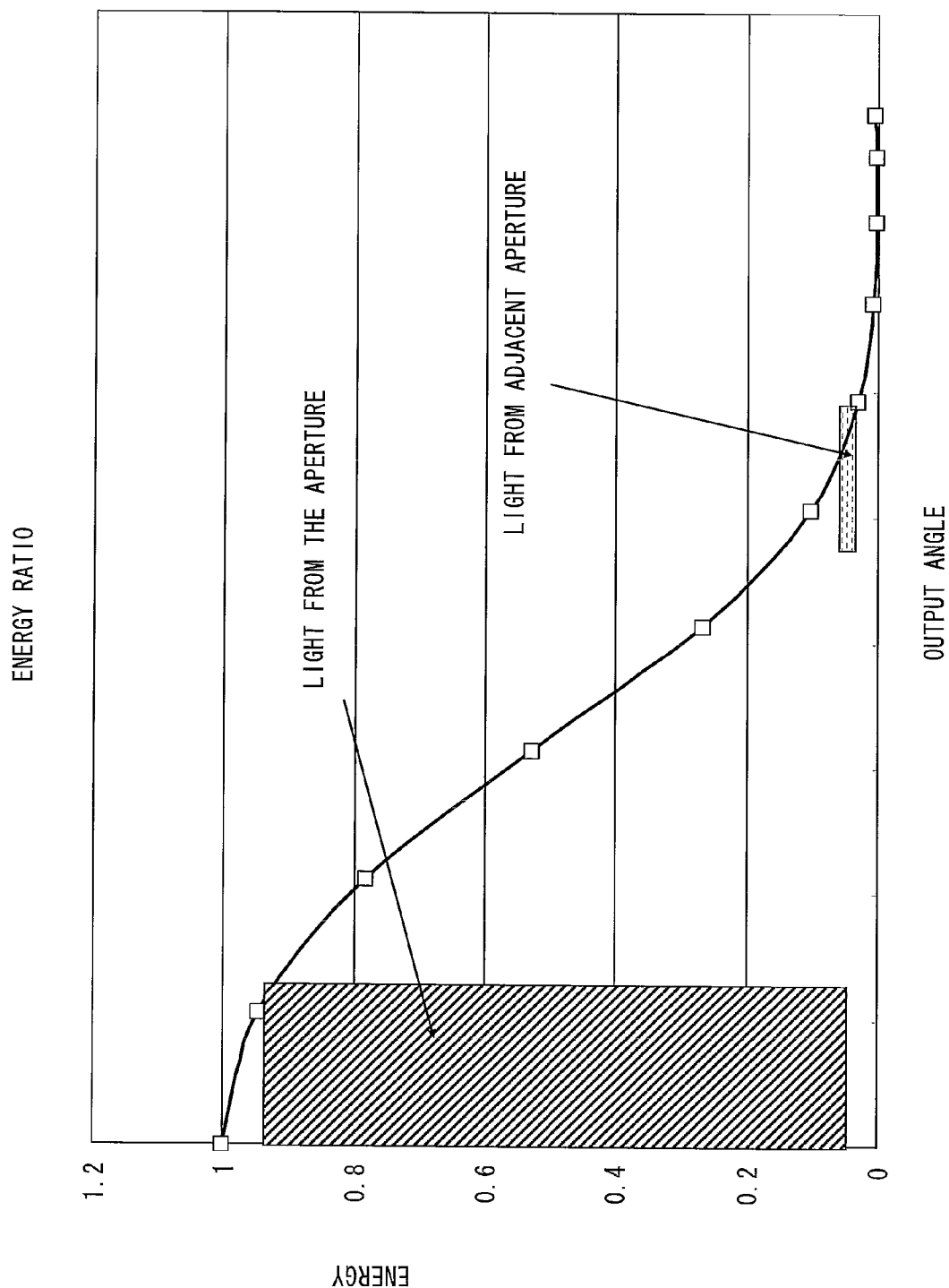
FIG. 4 is a graph to describe an effect of a filter layer according to the first embodiment of the present invention.
Figure 5:
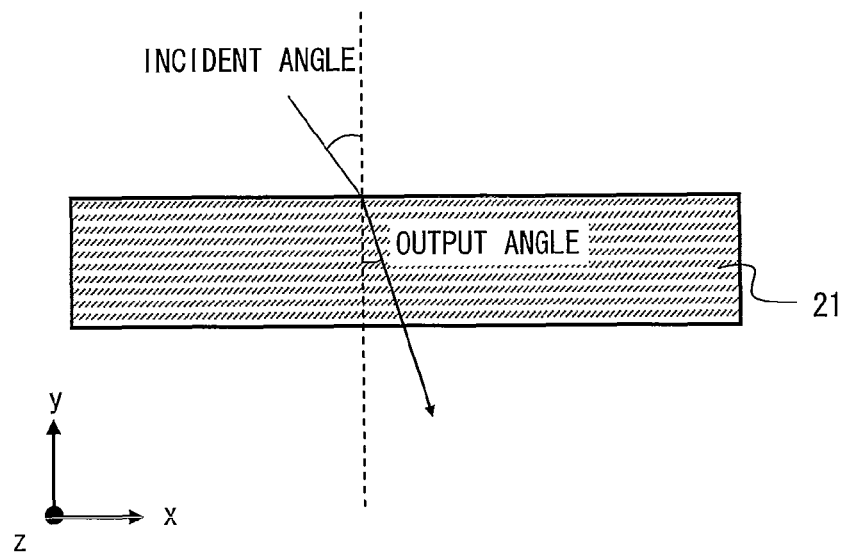
FIG. 5 is an explanatory view to describe an incident angle according to the first embodiment of the present invention.
Figure 6:
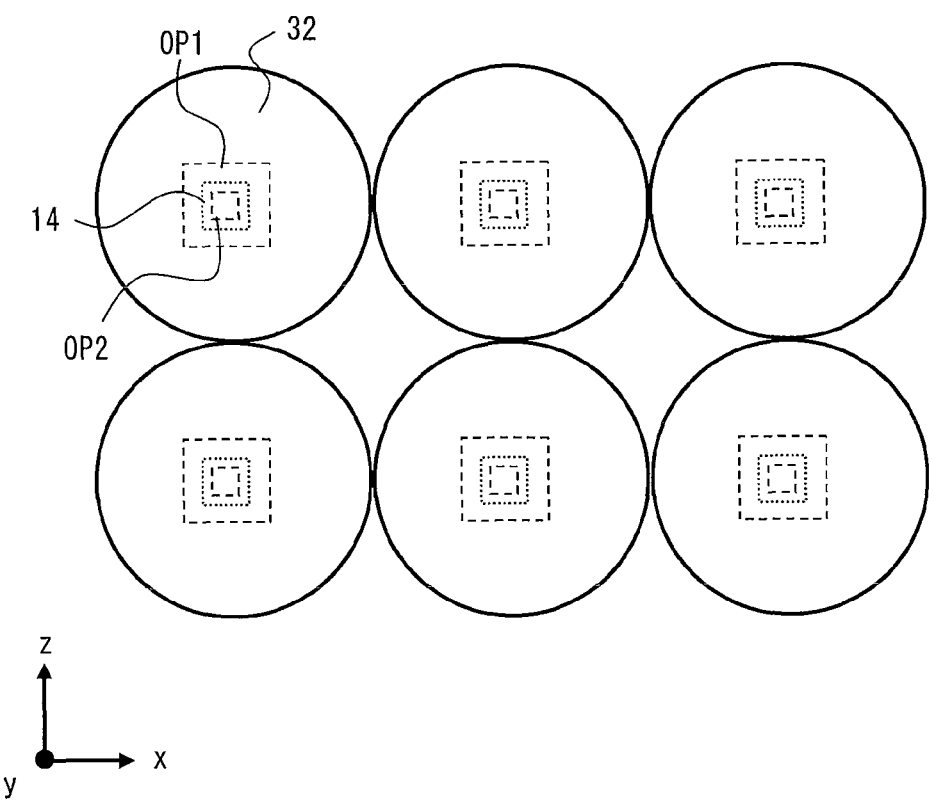
FIG. 6 is an explanatory view to describe a positional relationship between a lens, an opening and a pixel according to the first embodiment of the present invention.
Figure 9:
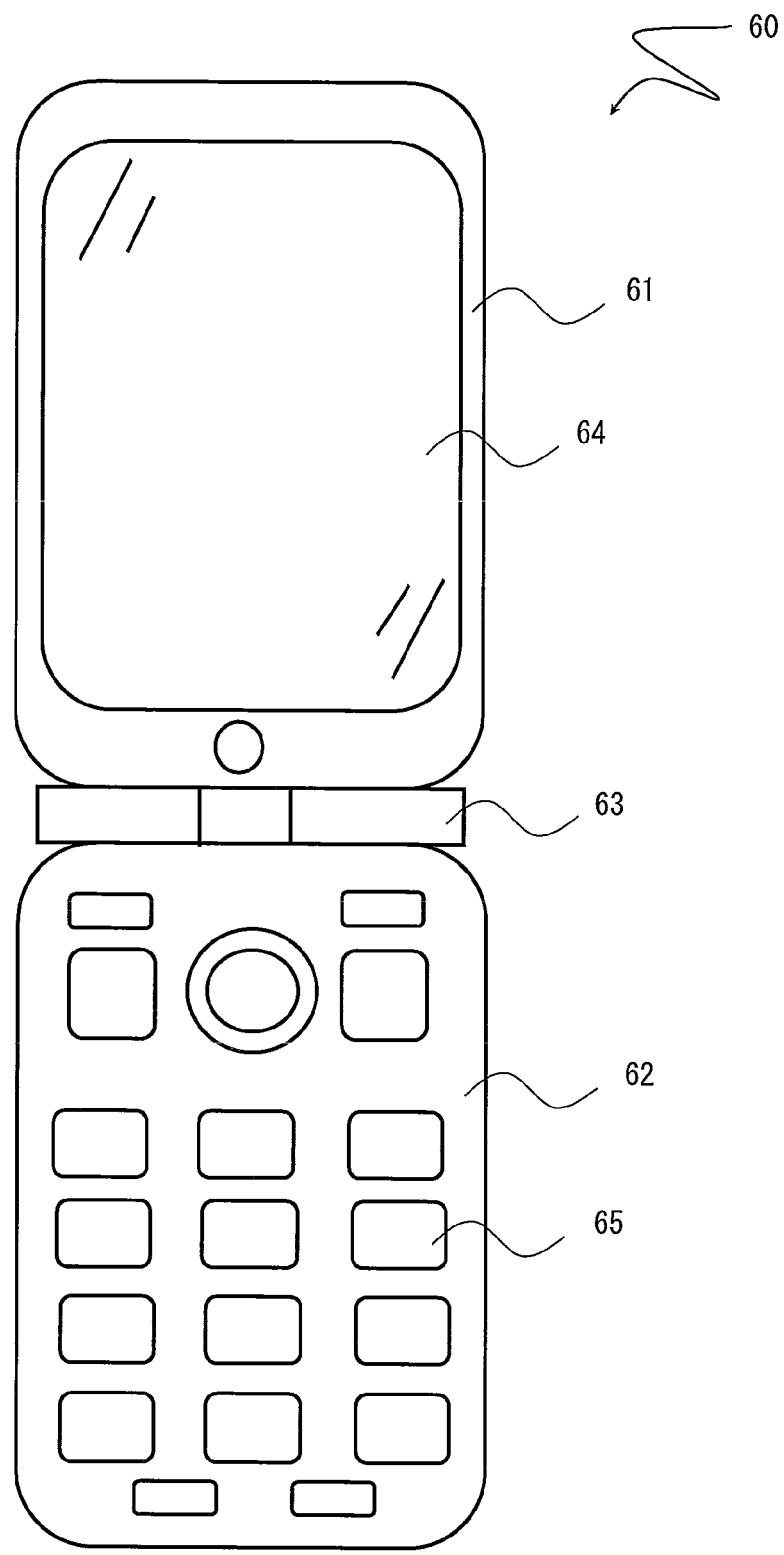
FIG. 9 is an explanatory view showing a structure of a cellular phone incorporating a biometric authentication apparatus according to the first embodiment of the present invention.
Figure 10:
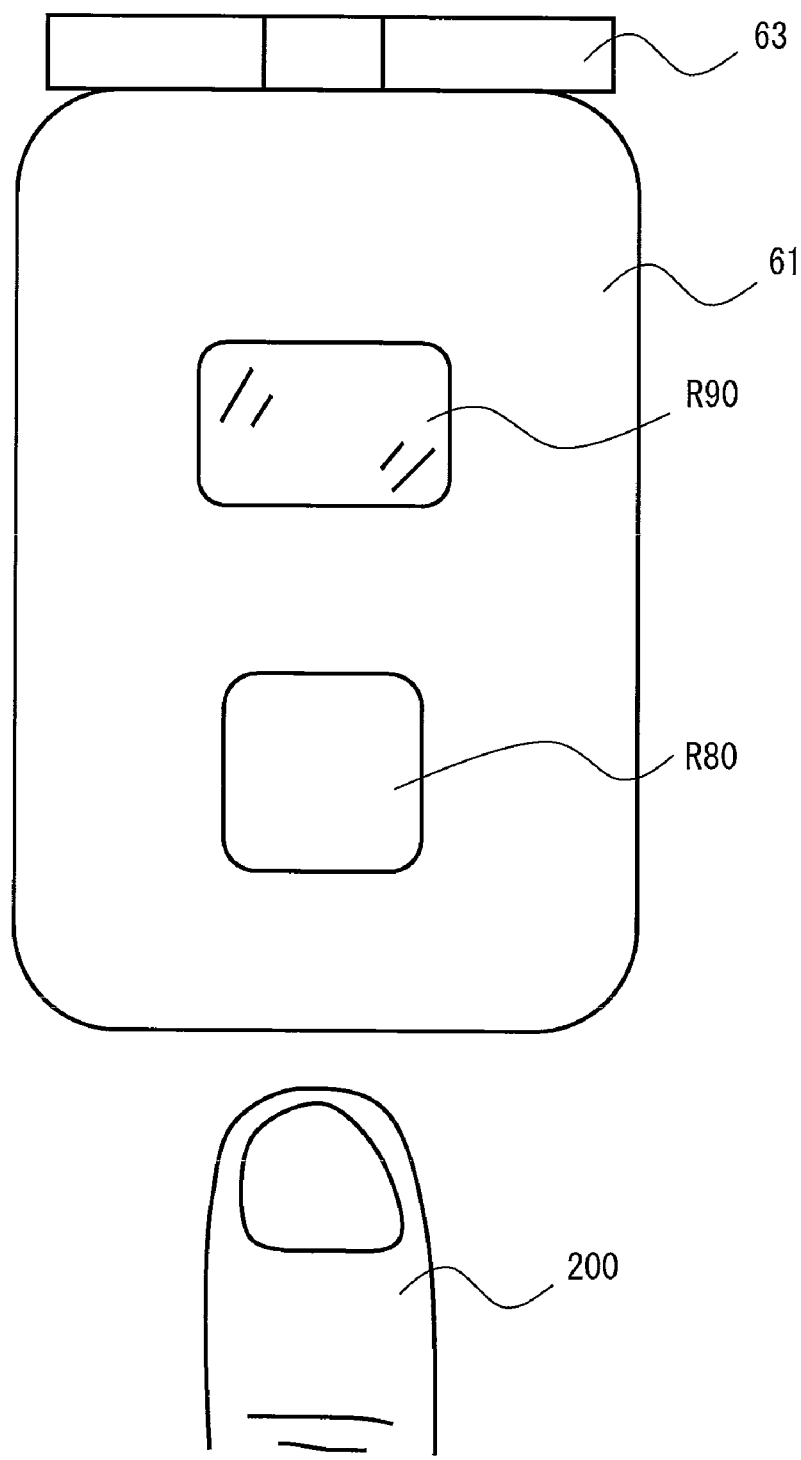
FIG. 10 is a top view of the cellular phone in a folded state according to the first embodiment of the present invention.
Figure 11:
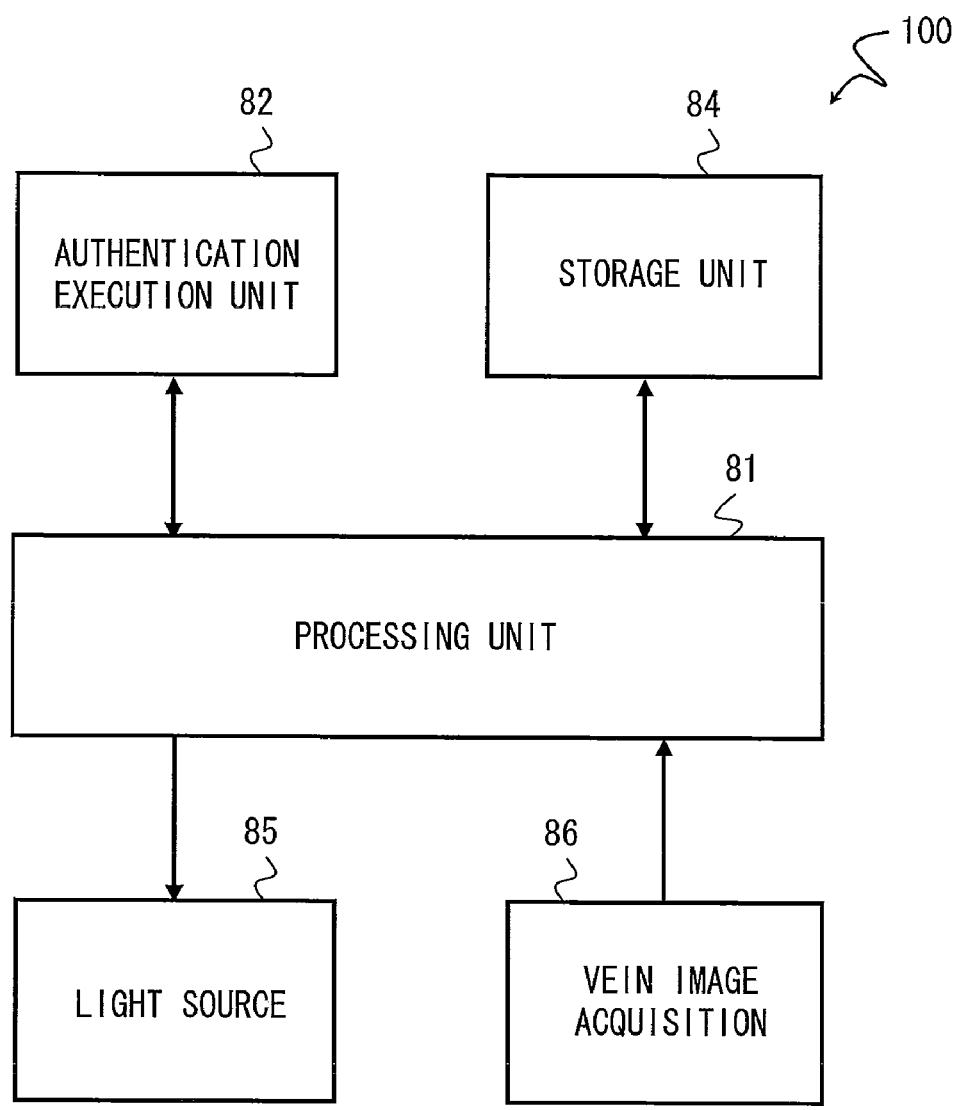
FIG. 11 is a schematic block diagram showing a system configuration of a biometric authentication apparatus according to the first embodiment of the present invention.
Figure 12:
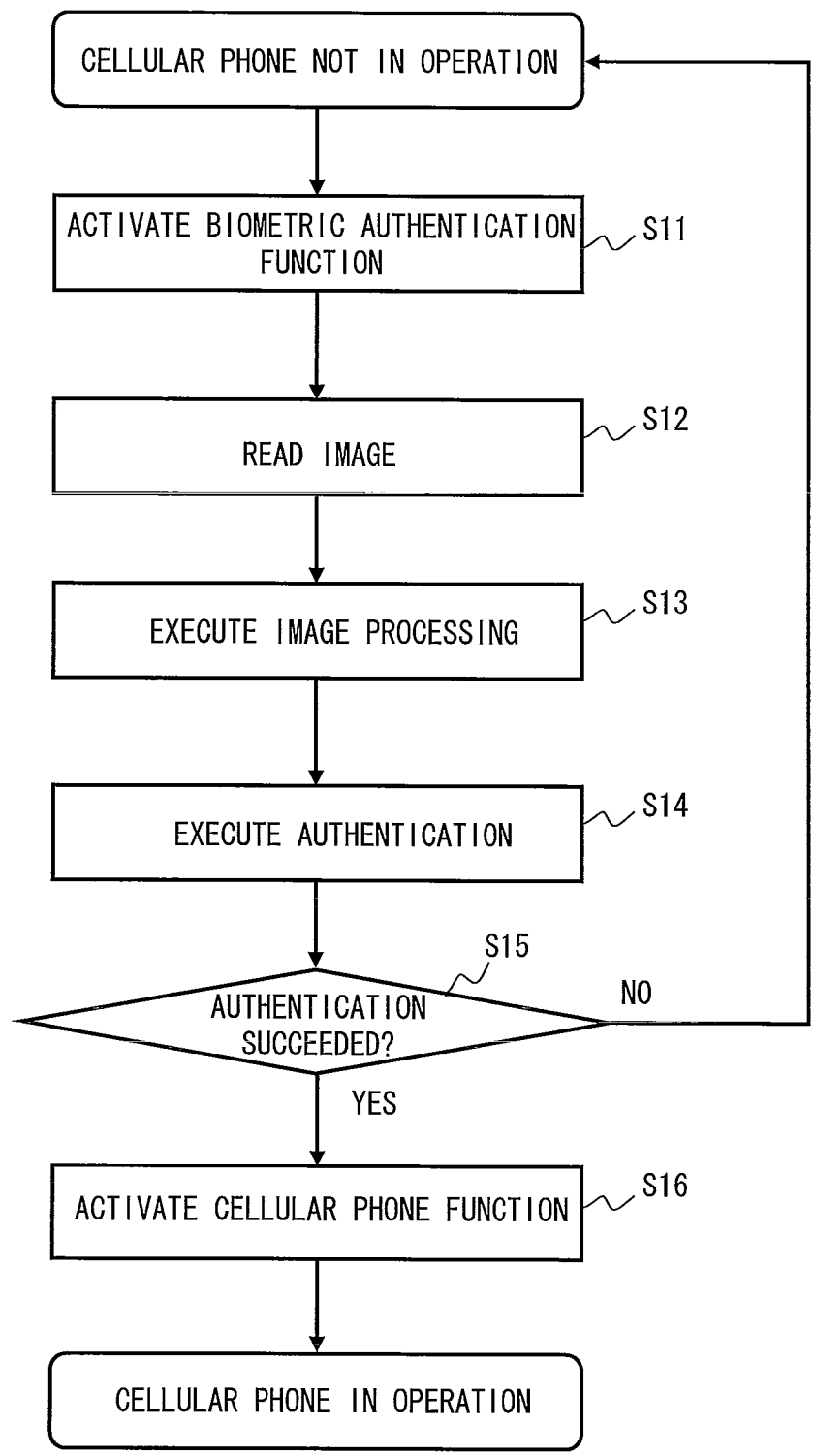
FIG. 12 is a flowchart to describe an operation of a biometric authentication apparatus according to the first embodiment of the present invention.

A first embodiment of the present invention is described hereinafter with reference to FIGS. 1 to 12. FIGS. 1 and 2 are explanatory views showing a schematic structure of a biometric authentication apparatus. FIG. 3 is a schematic cross-sectional view of an image acquisition apparatus. FIG. 4 is a graph to describe an effect of a filter layer. FIG. 5 is an explanatory view to describe an incident angle. FIG. 6 is an explanatory view to describe a positional relationship between a lens, an opening and a pixel. FIGS. 7A to 8E are process charts showing a method of manufacturing an image acquisition apparatus. FIG. 9 is an explanatory view showing a structure of a cellular phone incorporating a biometric authentication apparatus. FIG. 10 is a top view of a cellular phone in a folded state. FIG. 11 is a schematic block diagram showing a system configuration of a biometric authentication apparatus. FIG. 12 is a flowchart to describe an operation of a biometric authentication apparatus.

Referring to FIG. 1, a biometric authentication apparatus 100 includes a light source 110, a controller 120 and an image acquisition apparatus 150. The light source 110 and the image acquisition apparatus 150 are connected to the controller 120. As described later, the image acquisition apparatus 150 also functions as a biometric information acquisition apparatus.

The light source 110 is a general semiconductor light element such as a light emitting diode (LED) or a laser diode (LD). The light source 110 emits infrared light (near-infrared light to far-infrared light) that are absorbed by a vein 201 of a human finger 200.

The image acquisition apparatus 150 receives the light that has passed through the human finger 200, captures an image of the vein 201 and outputs an acquired vein image to the controller 120.

The controller 120 is a normal computer, for example. The controller 120 implements various functions by executing a program stored in a storage unit by a CPU. Specifically, the controller 120 drives the light source 110 so as to output infrared light from the light source 110. Further, the controller 120 drives the image acquisition apparatus 150 so as to capture an image of the vein 201 of the finger 200 (which is sometimes referred to hereinafter as a vein image).

The controller 120 also executes biometric authentication. The controller 120 calculates the degree of approximation of currently obtained biometric information with respect to previously registered biometric information and determines a current authentication result based on the calculation result.

The structure and operation of the biometric authentication apparatus 100 are described later.

Referring to FIG. 2, an infrared pass filter 130 is placed above the image acquisition apparatus 150. The infrared pass filter 130 passes light with a wavelength in an infrared region (particularly, near-infrared light) and rejects light in the other region. The position of the light source 110 relative to the finger 200 is arbitrary. For example, the light source 110 may be placed as shown in FIG. 2, so that light is applied to the finger 200 from the backside of the finger 200.

FIG. 3 shows a schematic cross-sectional structure of the image acquisition apparatus 150. Referring to FIG. 3, the image acquisition apparatus 150 includes an image sensor (image pickup device) 10, an optical function layer 20 and a lens array substrate 30, which are laminated in this order from the bottom. An adhesive layer 40 is placed between the image sensor 10 and the optical function layer 20. Further, an adhesive layer 50 is placed between the optical function layer 20 and the lens array substrate 30. A lamination of the optical function layer 20 and the lens array substrate 30 forms an optical component.

Specific explanation is given hereinbelow.

The image sensor 10 is a general image pickup device such as a complementary metal-oxide semiconductor (CMOS) sensor or a charge-coupled device (CCD) sensor.

The image sensor 10 includes a semiconductor substrate 11 and a wiring layer 12. The semiconductor substrate 11 is a normal silicon substrate. On the principal surface (imaging surface) of the semiconductor substrate 11, a plurality of pixels 14 are arranged two-dimensionally (cf. FIG. 6). The pixel 14 is formed by diffusing an impurity into the semiconductor substrate. In the pixel 14, an electric signal having a value corresponding to the intensity of incident light is generated. A specific structure of the semiconductor substrate 11 is arbitrary.

The wiring layer 12 is formed by depositing an insulating layer such as a silicon oxide layer. A metal wire that functions as a signal transmission line is embedded in the deposited insulating layer.

A light shielding layer 13 is placed on the wiring layer 12. The light shielding layer 13 has an opening OP2 corresponding to each optical axis. The light shielding layer 13, together with a light shielding layer 22 described later, forms a light shielding structure for preventing crosstalk.

The light shielding layer 13 has the property of absorbing output light from the light source 110. In other words, the light shielding layer 13 functions as an infrared absorbing layer. The light shielding layer 13 is made of black resin, for example. The light shielding layer 13 has the opening OP2 on an optical axis AX. The opening OP2 is made by partially removing the light shielding layer 13. In order to suppress the occurrence of stray light due to reflection on the light shielding layer 13, it is preferred to form the light shielding layer 13 with a low-reflectance material. The light shielding layer 13 may be embedded in the wiring layer 12.

The "opening" indicates an opening in optical terms, and the opening may be filled with a substance of some kind. The same applies to the opening OP1. In this manner, the meaning of the opening should be interpreted in a technically broad sense.

The optical function layer 20 is placed between the image sensor 10 and the lens array substrate 30. The optical function layer 20 includes a filter layer 21 and a light shielding layer 22.

The filter layer 21 is a flat-shaped member having a filter property. The light transmittance of the filter layer 21 varies according to the incident angle of incident light. At a given wavelength, the light transmittance of the filter layer 21 decreases as the incident angle of incident light increases. In other words, the filter layer 21 is transparent to light at an incident angle of close to zero and non-transparent to light at a large incident angle. This reduces stray light as a noise component which is input to a certain pixel through an adjacent lens, thereby effectively suppressing the influence of stray light as shown in FIG. 4.

FIG. 4 shows energy that is generated in a certain pixel by light having passed through an aperture on a common optical axis. FIG. 4 also shows energy that is generated in a certain pixel by light having passed through an aperture not on a common optical axis. FIG. 4 is a graph obtained as a result of simulation under given conditions.

As shown in FIG. 5, the incident angle indicates an angle between the normal to the principal surface of the filter layer 21 and an incident light ray.

A specific material of the filter layer 21 is arbitrary. By imparting a refractive property or a diffractive property to the filter layer 21, the light transmittance of the filter layer 21 can be set to depend on the incident angle.

For example, the filter layer 21 may be made of a lamination of a plurality of thin films with a controlled refractive index. Alternatively, the filter layer 21 may be made of an optical structure to which an optical diffraction grating is applied. In each case, it is preferred to place the lamination on a support substrate such as a glass plate. In the case of performing a step of fixing members with ultraviolet curable resin, it is preferred to form the filter layer 21 with a material having properties that the transparency of ultraviolet light does not depend on the incident angle.

Referring back to FIG. 3, the light shielding layer 22 has the property of absorbing output light from the light source 110. In other words, the light shielding layer 22 functions as an infrared absorbing layer. The light shielding layer 22 is made of black resin, for example. The light shielding layer 22 has an opening OP1 on the optical axis AX. The opening OP1 is made by partially removing the light shielding layer 22. In order to suppress the occurrence of stray light due to reflection on the light shielding layer 22, it is preferred to form the light shielding layer 22 with a low-reflectance material.

The lens array substrate 30 includes a transparent substrate 31 and a plurality of lenses 32.

The transparent substrate 31 is a plate-shaped member, and it is substantially transparent to output light of the light source 110. The transparent substrate 31 is a glass plate, for example.

The plurality of lenses 32 are arranged two-dimensionally on the principal surface of the transparent substrate 31. The incident light from the object side receives the lens effect on the lens surface of the lens 32 and converges to the pixel 14, traveling along the optical axis AX.

The adhesive layers 40 and 50 are made of normal heat curable resin or energy line curable resin (e.g. ultraviolet curable resin etc.).

The light having passed through the lens 32 passes through the transparent substrate 31, the adhesive layer 50, the opening OP1 of the light shielding layer 22, the filter layer 21, the adhesive layer 40 and the opening OP2 of the light shielding layer 13 and then enters the pixel 14. In each pixel 14, the input light is photoelectrically converted, and an electric signal having a value corresponding to the intensity of the input light is generated. The electric signal generated in each pixel 14 is supplied to an external bus by a reading operation of the image sensor 10.

As shown in FIG. 6, the pixel 14, the opening OP1, the opening OP2 and the lens 32 are arranged coaxially. The opening width (opening area) of the opening OP1 is set to be larger than the opening width (opening area) of the opening OP2.

In this embodiment, a light shielding structure is formed by a layered structure of a plurality of light shielding layers (the light shielding layer 22 and the light shielding layer 13) along the optical axis AX. Specifically, the light shielding layer 22 is formed on the principal surface of the filter layer 21, and the light shielding layer 13 is formed on the principal surface of the wiring layer 12, by using a normal thin film formation technique.

By forming the light shielding structure with the layered structure of light shielding layers each having a substantially uniform in-plane thickness, the thickness of each light shielding layer can be set to be sufficiently small. It is thereby possible to form the light shielding layers without taking a long process time and further make openings easily in the light shielding layers. Because there is no need to form each light shielding layer to be thick, it is possible to suppress variation of the in-plane thickness of each light shielding layer. By suppressing variation of the in-plane thickness of each light shielding layer, it is possible to suppress the occurrence of partial unevenness in tone in an acquired image.

A method of manufacturing the image acquisition apparatus 150 is described hereinafter with reference to FIGS. 7A to 8E.

Figure 7A:
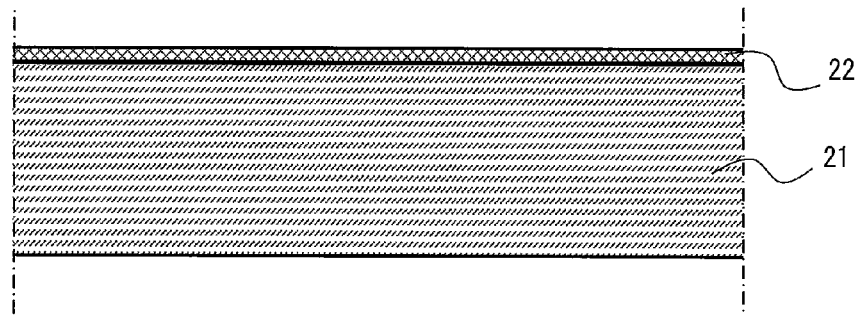
FIGS. 7A to 7C are process charts showing a method of manufacturing an image acquisition apparatus according to the first embodiment of the present invention.
Figure 7B:
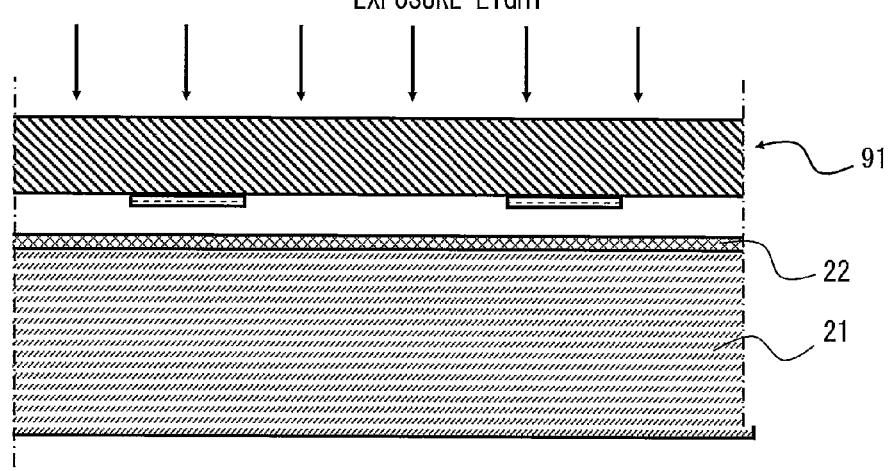
Figure 7C:
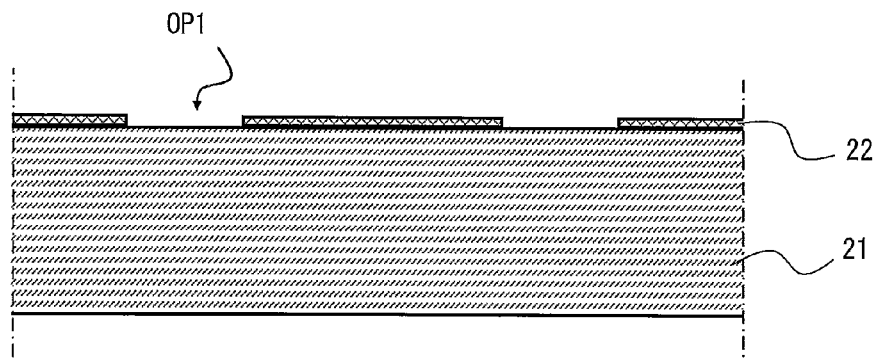

Referring first to FIGS. 7A to 7C, a method of manufacturing the optical function layer 20 is described.

First, as shown in FIG. 7A, the light shielding layer 22 is formed on the front surface (principal surface) of the filter layer 21 by a normal thin film formation technique (spin coating etc.).

The thickness of the light shielding layer 22 is controlled to be substantially uniform in a plane. The thickness of the light shielding layer 22 is set to be about 1 μm. Generally, control of the thickness is difficult if the thickness is large. Thus, by setting the thickness of the light shielding layer 22 to be small, variation of the in-plane thickness of the light shielding layer 22 can be effectively suppressed. By preventing the thickness of the light shielding layer 22 from varying in a plane, it is possible to improve the quality of an image that is finally acquired in the image sensor 10. For example, it is possible to suppress the occurrence of partial unevenness in tone in an acquired image.

Next, as shown in FIG. 7B, exposure light is applied to the light shielding layer 22 through a photomask 91.

Then, as shown in FIG. 7C, a part that is not radiated with the exposure light is removed by a developer. The light shielding layer 22 is negative resist. Thus, a part that is radiated with the exposure light and changed in property remains, and a part that is not radiated with the exposure light is removed by a developer.

The optical function layer 20 is manufactured by the above procedure. The openings OP1 are made by a photolithography process including exposure and development. The intervals of the openings OP1 can be set highly accurately. Further, the widths of the openings OP1 can be set equally in a plane. Because the thickness of the light shielding layer 22 is small, the steps of FIGS. 7A to 7C do not take a long time.

Referring then to FIGS. 8A to 8E, a method of manufacturing the image acquisition apparatus 150 is further described.

Figure 8A:
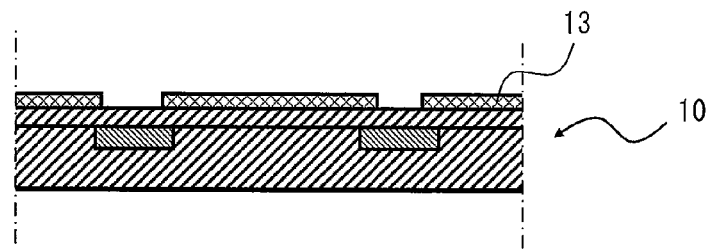
FIGS. 8A to 8E are process charts showing a method of manufacturing an image acquisition apparatus according to the first embodiment of the present invention.

First, as shown in FIG. 8A, the light shielding layer 13 is formed on the principal surface of the image sensor 10 by a normal coating technique (spin coating etc.), and the light shielding layer 13 is patterned by photolithography.

Like the case of the light shielding layer 22, the thickness of the light shielding layer 13 is controlled to be substantially uniform in a plane. The thickness of the light shielding layer 13 is set to be about 1 μm. Generally, control of the thickness is difficult if the thickness is large. Thus, by setting the thickness of the light shielding layer 13 to be small, variation of the in-plane thickness of the light shielding layer 13 can be effectively suppressed. By preventing the thickness of the light shielding layer 13 from varying in a plane, it is possible to improve the quality of an image that is finally acquired in the image sensor 10.

Figure 8B:
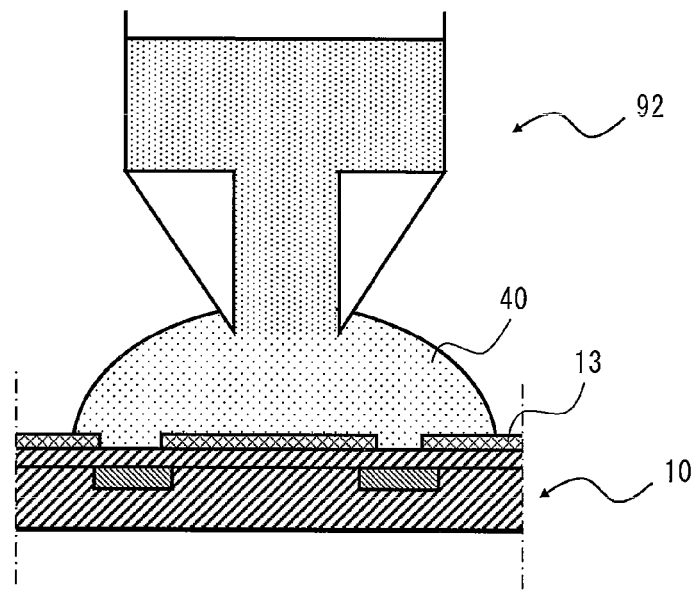

Next, as shown in FIG. 8B, the adhesive layer 40 is coated over the image sensor 10 by a dispenser (coater) 92. The thickness of the adhesive layer 40 is about 10 to 20 μm.

Figure 8C:
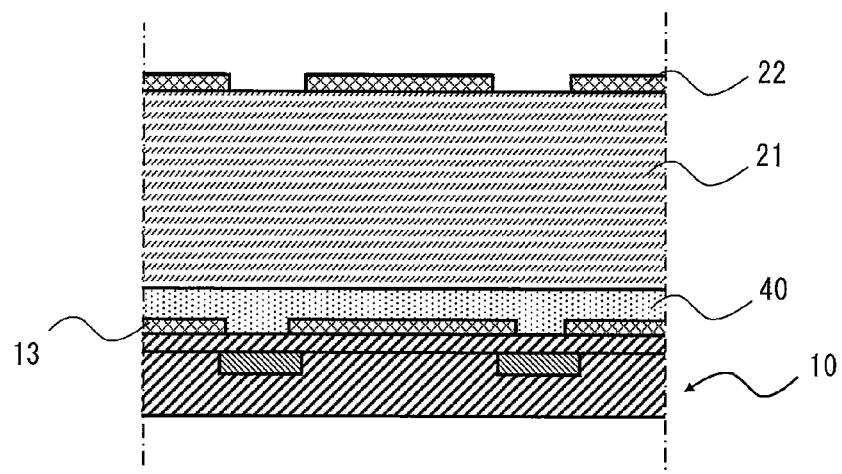

Then, as shown in FIG. 8C, the optical function layer 20 is placed on the adhesive layer 40. If the adhesive layer 40 is ultraviolet curable resin, ultraviolet light is applied. If, on the other hand, the adhesive layer 40 is heat curable resin, heat is applied. The optical function layer 20 and the image sensor 10 are thereby bonded with each other through the adhesive layer 40.

Figure 8D:
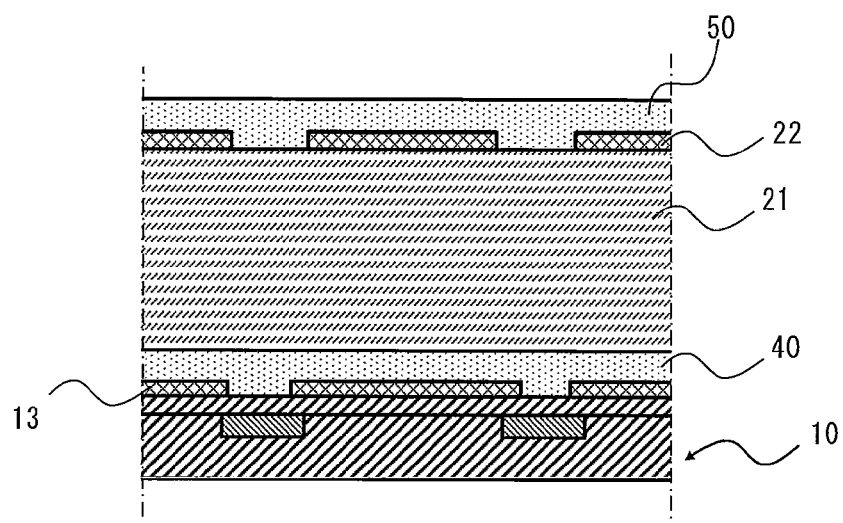

Further, as shown in FIG. 8D, the adhesive layer 50 is coated over the filter layer 21 by a dispenser (not shown).

Figure 8E:
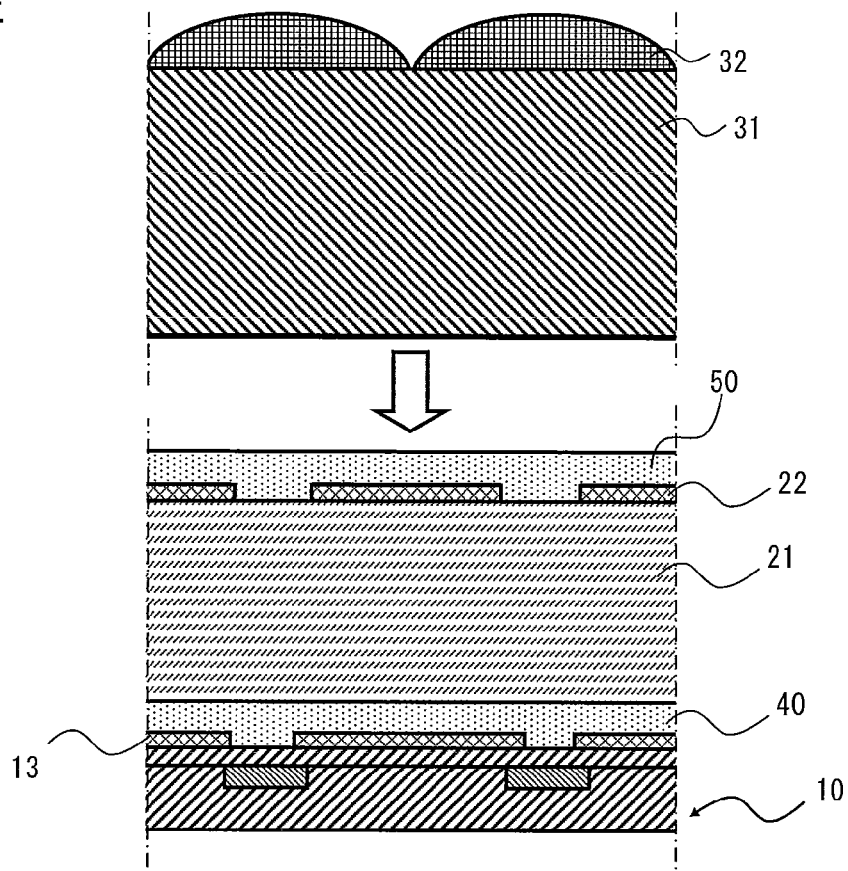

Then, as shown in FIG. 8E, the lens array substrate 30 is placed on the adhesive layer 50. If the adhesive layer 50 is ultraviolet curable resin, ultraviolet light is applied. If, on the other hand, the adhesive layer 50 is heat curable resin, heat is applied. The lens array substrate 30 is thereby bonded with the lamination of the image sensor 10 and the optical function layer 20. The image acquisition apparatus 150 is thereby manufactured.

A method of forming the lens 32 on the transparent substrate 31 is arbitrary. For example, the lens 32 is molded by applying an energy line with a modified intensity to an energy line curable resin layer (e.g. ultraviolet curable resin etc.) coated on the transparent substrate 31 and then removing an uncured part of the resin layer.

As described above, in this embodiment, the filter layer 21 whose light transmittance varies according to the incident angle of incident light is placed between the image sensor 10 and the lens array substrate 30. Specifically, the filter layer 21 whose light transmittance decreases with an increase in the incident angle of incident light is placed. It is thereby possible to reduce stray light as a noise component which is input to a certain pixel through an adjacent lens and effectively suppress the influence of stray light. It is thus possible to finally acquire a higher quality image.

Further, in this embodiment, a light shielding structure is formed by a layered structure of a plurality of light shielding layers (the light shielding layer 13 and the light shielding layer 22) along the optical axis AX. Specifically, the light shielding layer 13 is formed on the principal surface of the image sensor 10, and the light shielding layer 22 is formed on the principal surface of the filter layer 21, by using a normal thin film formation technique.

By forming the light shielding structure with the layered structure of the light shielding layers each having a substantially uniform in-plane thickness, the thickness of each light shielding layer can be set to be sufficiently small. It is thereby possible to form the light shielding layers without taking a long process time and further make openings easily in the light shielding layers. Because there is no need to form each light shielding layer to be thick, it is possible to suppress variation of the in-plane thickness of each light shielding layer. By suppressing variation of the in-plane thickness of each light shielding layer, it is possible to suppress the occurrence of partial unevenness in tone in an acquired image.

A structure of a cellular phone (electronic equipment) that incorporates the biometric authentication apparatus 100 (the image acquisition apparatus 150) is described hereinafter with reference to FIGS. 9 and 10.

FIG. 9 shows a cellular phone (mobile communication terminal) 60. The cellular phone 60 incorporates the above-described biometric authentication apparatus (vein authentication apparatus) 100.

Referring to FIG. 9, the cellular phone 60 includes an upper main body (first member) 61, a lower main body (second member) 62 and a hinge 63. The upper main body 61 and the lower main body 62 are plate-shaped members made of plastic and joined by the hinge 63. The upper main body 61 and the lower main body 62 are configured to be openable and closable by the hinge 63. When the upper main body 61 and the lower main body 62 are in the closed state, the cellular phone 60 is in the form of a plate-like member with the upper main body 61 and the lower main body 62 overlapping with each other.

The upper main body 61 has a display unit 64 on its inner surface. On the display unit 64, information identifying a person at the other end of an incoming call (name, telephone number etc.), an address book stored in a storage unit of the cellular phone 60 or the like is displayed. A liquid crystal display apparatus is mounted below the display unit 64.

The lower main body 62 has a plurality of buttons 65 on its inner surface. A user of the cellular phone 60 manipulates the buttons 65 to open the address book, make a phone call or sets the phone to a silent mode, for example, thereby operating the cellular phone 60 as desired. A user of the cellular phone 60 turns on or off the biometric authentication function of the biometric authentication apparatus 100 built in the cellular phone 60 by manipulating the buttons 65.

FIG. 10 shows a structure of the front surface (top surface) of the cellular phone 60. As shown in FIG. 10, a surface region R80 and a display region R90 are placed on the front surface of the upper main body 61.

On the surface region R80, a finger 200 of a human (test body) is placed as schematically shown in FIG. 10. The above-described image acquisition apparatus 150 is mounted below the surface region R80. On the display region R90, characters (time, operating state, name of a person at the other end of an incoming call etc.) are displayed. The liquid crystal display apparatus is mounted below the display region R90.

Finally, the structure and operation of the biometric authentication apparatus 100 are schematically described hereinafter with reference to FIGS. 11 and 12.

Referring to FIG. 11, the biometric authentication apparatus 100 includes a processing unit 81, an authentication execution unit 82, a storage unit 84, a light source 85 and a vein image acquisition unit 86. The light source 85 corresponds to the light source 110. The vein image acquisition unit 86 corresponds to the image acquisition apparatus 150.

The biometric authentication apparatus 100 is formed with inclusion of a normal computer in which the vein image acquisition unit 86 and the light source 85 are connected to an interface. The biometric authentication apparatus 100 is not limited to the structure shown in FIG. 11.

The biometric authentication apparatus 100 operates as shown in FIG. 12.

In the initial state, the cellular phone 60 that incorporates the biometric authentication apparatus 100 is in a non-operating state.

First, the biometric authentication function of the cellular phone 60 is activated (S11). A specific method of activating the biometric authentication function is arbitrary. For example, when a finger of a user is placed on the front surface of a cover plate, a detection signal is output from a capacitance sensor. The output signal of the capacitance sensor is supplied to the processing unit 81 through a flexible wiring. The processing unit 81 drives the light source 85 based on the detection signal from the capacitance sensor and has the vein image acquisition unit 86 acquire a vein image.

Next, image reading is executed (S12). The processing unit 81 directs the vein image acquisition unit 86 to output an acquired image. In response to the reading direction from the processing unit 81, the vein image acquisition unit 86 outputs acquired image data to a bus.

Then, the processing unit 81 executes image processing on the acquired image data that is input through the bus (S13).

After that, the authentication execution unit 82 executes authentication (S14). The authentication execution unit 82 executes biometric authentication based on an image for authentication that is output from the processing unit 81 and a vein image that is previously registered in the storage unit 84. For example, the authentication execution unit 82 determines that the authentication is succeeded if the branching pattern of veins matches between the both images at N (N is a natural number of 2 or above) or more number of points, and it determines that the authentication is failed if the branching pattern of veins matches between the both images at less than N number of points (S15). Because a specific method of authentication depends on an image processing method, it is not limited to the above example.

If the authentication is succeeded, the function of the cellular phone 60 that incorporates the biometric authentication apparatus 100 is activated (S16). Then, the cellular phone 60 returns to a normal operating state. If, on the other hand, the authentication is failed, the cellular phone 60 that incorporates the biometric authentication apparatus 100 remains in the non-operating state.

By incorporating the biometric authentication apparatus 100 into the cellular phone as described above, the security of the cellular phone increases significantly.

Second Embodiment

Figure 13:
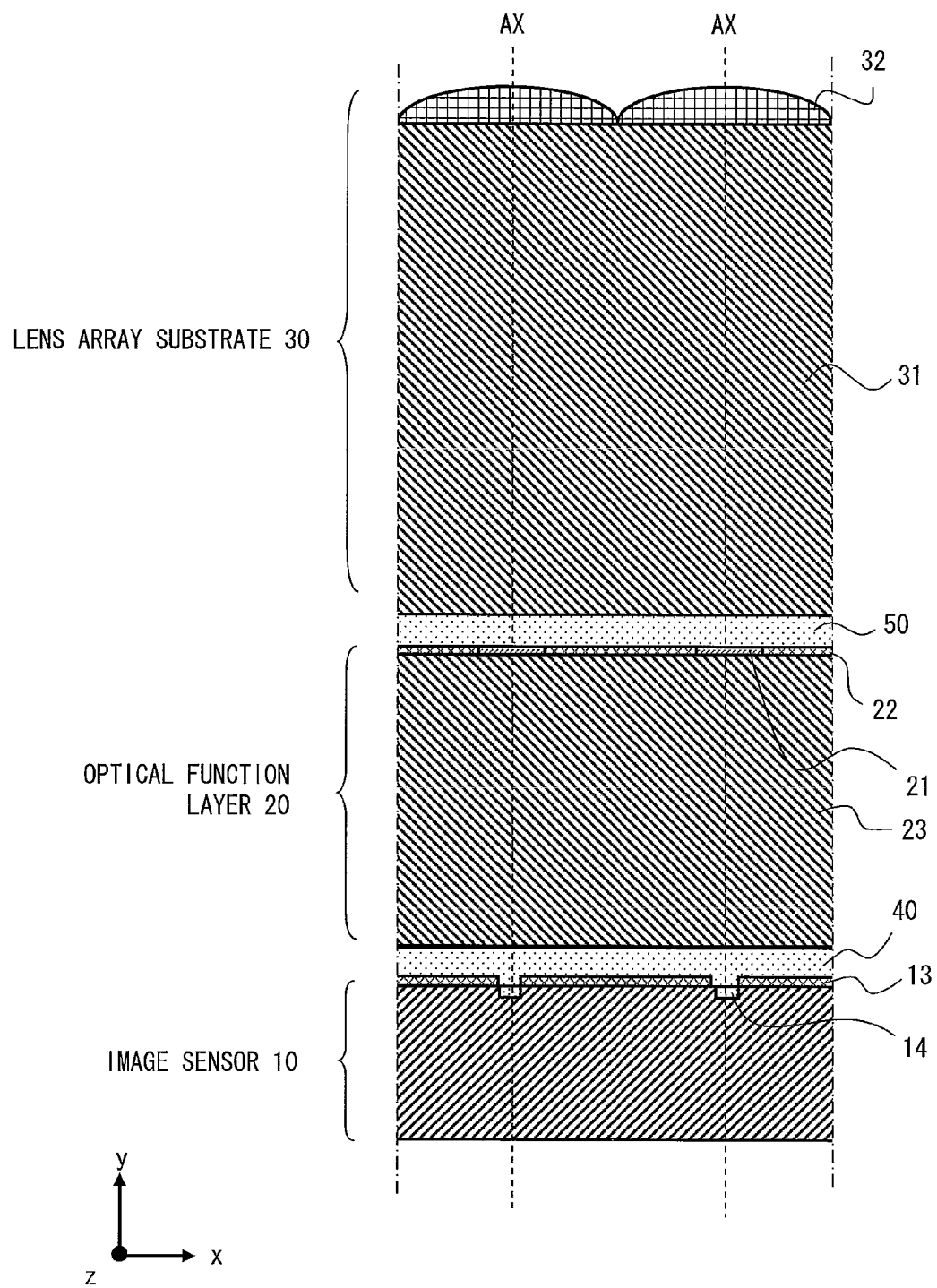
FIG. 13 is a schematic cross-sectional view of an image acquisition apparatus according to a second embodiment of the present invention.

A second embodiment of the present invention is described hereinafter with reference to FIG. 13. FIG. 13 is a schematic cross-sectional view of an image acquisition apparatus.

In this embodiment, the optical function layer 20 has a structure in which the filter layer 21 and the light shielding layer 22 are placed on the principal surface of a transparent substrate (support substrate) 23. In such a case also, the same advantage as in the first embodiment can be obtained.

The transparent substrate 23 is a plate-shaped member and is substantially transparent to the output light of the light source 110. The transparent substrate 23 is a glass plate, for example.

In order to suppress the crosstalk, it is preferable to keep a sufficient optical distance between the light shielding layer 13 and the light shielding layer 22. In the case of forming a thick resin layer between the light shielding layer 13 and the light shielding layer 22 by a normal coating technique, there is a possibility that the quality of the image acquired in the image sensor 10 is deteriorated due to variation of the in-plane thickness of the resin layer. For example, there is a possibility that partial unevenness in tone occurs in the image due to variation of the in-plane luminance.

In this embodiment, the transparent substrate 23 is placed between the light shielding layer 13 and the light shielding layer 22. The in-plane thickness of the transparent substrate 23 is controlled to be substantially uniform during the manufacturing process. The optical distance between the light shielding layer 13 and the light shielding layer 22 is kept by the placement of the transparent substrate 23 with the substantially uniform in-plane thickness. It is thereby possible to suppress degradation of the quality of the image acquired in the image sensor 10.

Further, in this embodiment, the transparent substrate 23 can be piled on the image sensor 10 or the lens array substrate 30. By making good use of a mounting technology (piling technology), it is possible to manufacture the image acquisition apparatus 150 in a simple manner and thereby prevent the manufacture of the image acquisition apparatus 150 from taking a long time. Further, with use of the transparent substrate 23, the thickness of the adhesive layers 40 and 50 can be set to be small. It is thereby possible to effectively prevent the channel length of an optical channel formed between the lens 32 and the pixel 14 from varying largely in a plane, thereby enhancing acquisition of a high quality image.

Third Embodiment

Figure 14:
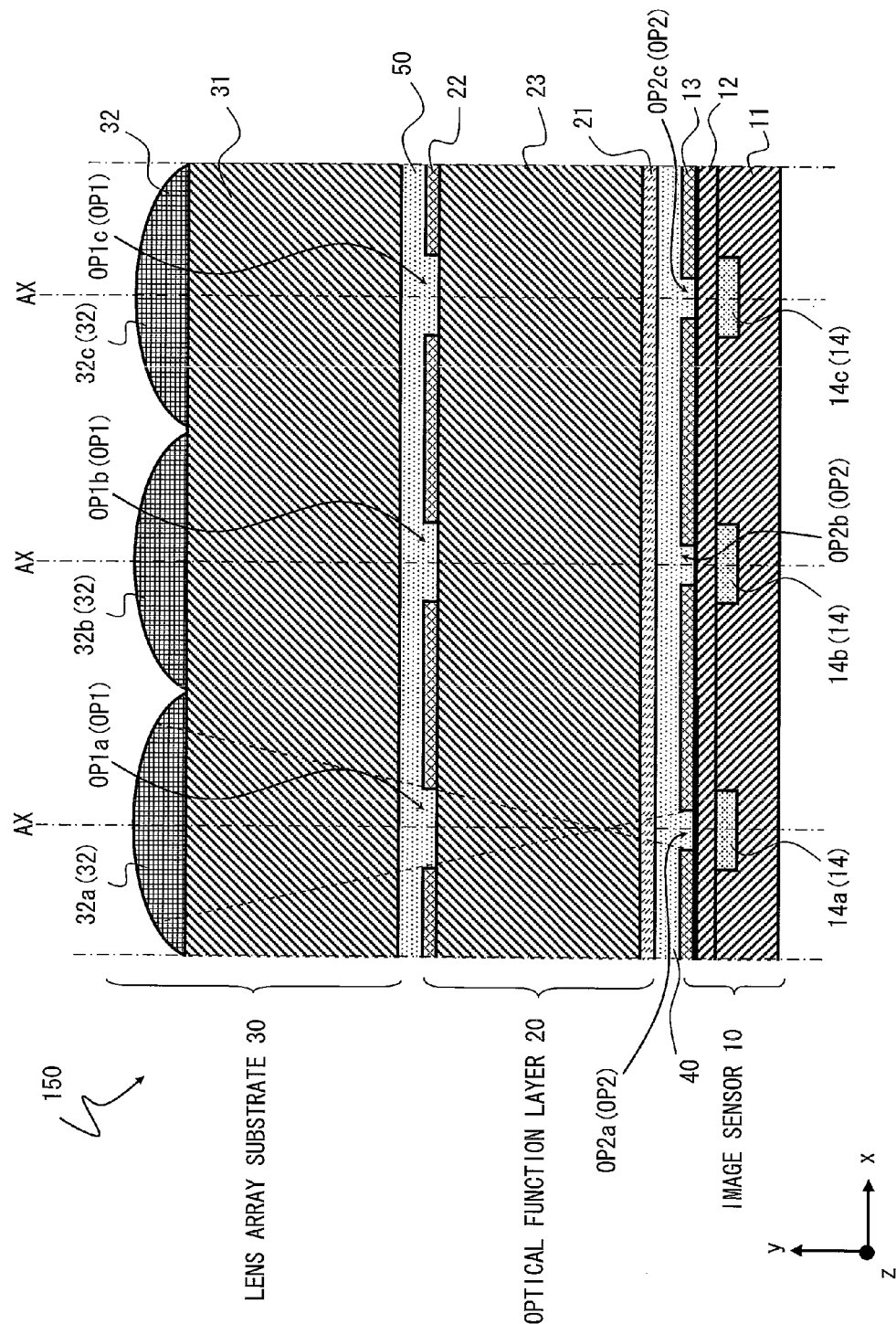
FIG. 14 is a schematic cross-sectional view of an image acquisition apparatus according to a third embodiment of the present invention.

A third embodiment of the present invention is described hereinafter with reference to FIG. 14 and FIGS. 15A to 15D. FIG. 14 is a schematic cross-sectional view of the image acquisition apparatus 150. FIGS. 15A to 15D are schematic manufacturing process charts of the optical function layer 20.

In this embodiment, the filter layer 21 is placed on the lower surface of the transparent substrate 23. In such a case also, the same advantage as in the first and second embodiments can be obtained. Specifically, by the filtering effect of the filter layer 21, incident light with a small incident angle passes through the filter layer 21, and incident light with a large incident angle is blocked by the filter layer 21. It is thereby possible to reduce the crosstalk and acquire a higher quality vein image.

As shown in FIG. 14, an opening OP2a, an opening OP1a and a lens 32a are arranged coaxially above a pixel 14a. Above a pixel 14b, an opening OP2b, an opening OP1b and a lens 32b are arranged coaxially. Above a pixel 14c, an opening OP2c, an opening OP1c and a lens 32c are arranged coaxially.

A light ray that is input to the lens 32a reaches the pixel 14a through the transparent substrate 31, the adhesive layer 50, the opening OP1a of the light shielding layer 22, the transparent substrate 23, the filter layer 21, the adhesive layer 40, the opening OP2a of the light shielding layer 13 and the wiring layer 12. The same explanation applies also to the other optical channels.

In this embodiment, like the above-described embodiments, the filter layer 21 is placed above the image sensor 10, thereby suppressing the crosstalk of the optical channel between the lens 32a and the pixel 14a and another optical channel between another lens and another pixel. By suppressing the crosstalk between the optical channels, it is possible to acquire a higher quality image in the image sensor 10.

In this embodiment, like the above-described embodiments, a two-layer light shielding structure made up of the light shielding layer 22 and the light shielding layer 13 is used, thereby suppressing the crosstalk and blocking unwanted light that is input through the opening OP1 of the light shielding layer 22 by means of the filter layer 21. It is thereby possible to effectively reduce the amount of incident light that is input to the pixel 14 through the non-coaxial lens 32.

The filter layer 21 is preferably composed of a plurality of thin films with a controlled refractive index, as in the above-described embodiments. It is preferred to use silica (SiO2), rutile (TiO2), alumina (Al2O3) or the like as a material of the thin films constituting the filter layer 21. A material of a high refractive index layer may be TaOx, TiOx, ZnS, ZnSn, GaP, InP, Si, Ge, SiGex, SiNx, SiCx, ZrOx, NbOx, YOx, a mixture of those or the like. A material of a low refractive index layer may be SiOx, MgF2, AlOx, SiOxCy, SiOxNy, MgOx, a mixture of those or the like.

In the case where the filter layer 21 is composed of a plurality of thin films with a controlled refractive index, a light ray with a large incident angle is reflected by the filter layer 21, and a light ray with a small incident angle passes through the filter layer 21. It is assumed, for example, that a light ray with an incident angle of equal to or larger than 60 degrees and smaller than 90 degrees is reflected about twice as much as a light ray with an incident angle of equal to or larger than 0 degrees and smaller than 30 degrees. In such a case, the light ray with an incident angle of equal to or larger than 60 degrees and smaller than 90 degrees is reflected by the filter layer 21 and absorbed by the light shielding layer 22, or released to the outside through the opening OP1 of the light shielding layer 22. In this manner, it is possible to effectively prevent the light reflected by the filter layer 21 from becoming stray light.

A specific structure of the light shielding layer 22 is arbitrary. It is thus arbitrary whether the light shielding layer 22 is provided with light absorbency. The light shielding layer 22 may be provided with reflexivity. For example, the light shielding layer 22 may be composed of a multilayer film made of Cr oxide such as a Cr metal, and an oxide or a nitride of Cr. The light shielding layer 22 reflects the incident light, therefore a light shielding being achieved. Alternatively, molybdenum silicide, tantalum, tungsten, molybdenum or the like may be used. Alternatively, the light shielding layer 22 may be made of black resin. Black resin absorbs the incident light, therefore a light shielding being achieved.

The light shielding layer 13 may be made by using a wire forming the wiring layer 12. If a wire forming the wiring layer 12 has a light shielding property, the wiring layer 12 can function as the light shielding layer 13 by covering the area other than the pixel with the wire. This reduces the number of process steps and thereby achieves price-reduction of products.

The optical function layer 20 can be manufactured by the method shown in FIGS. 15A to 15D, for example.

Figure 15A:
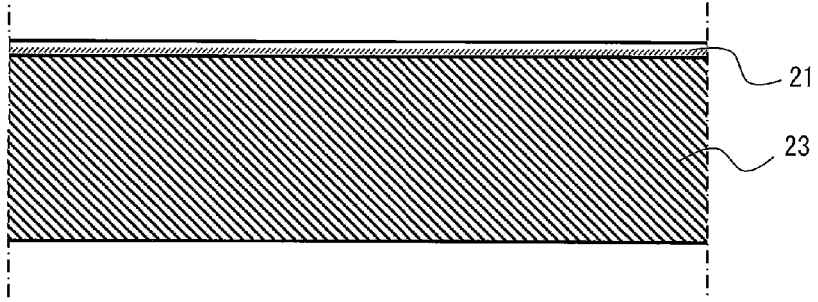
FIGS. 15A to 15D are schematic manufacturing process charts of an optical function layer according to the third embodiment of the present invention.

Firstly, as shown in FIG. 15A, the filter layer 21 is formed on the transparent substrate 23. In the case of forming the filter layer 21 with a lamination of a plurality of thin films with different refractive indexes, multiple thin films are formed in a laminated structure with control of the film thickness by a normal thin film formation technique such as vapor deposition, chemical vapor deposition (CVD) or the like. The refractive index and the thickness of thin films affect the dependence of the transmittance of an incident light ray on an incident angle and also affects the wavelength characteristics.

Figure 15B:
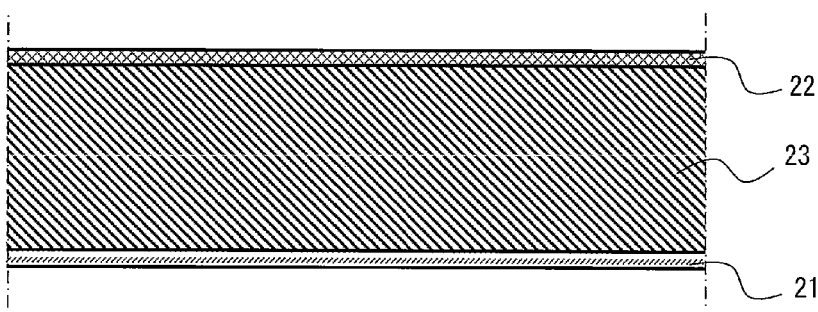

Next, as shown in FIG. 15B, the transparent substrate 23 is placed upside down, and the light shielding layer 22 is formed on the upper surface of the transparent substrate 23. In this case, the light shielding layer 22 is a black resist layer. The light shielding layer 22 can be formed by a normal coating technique such as spin coating.

Figure 15C:
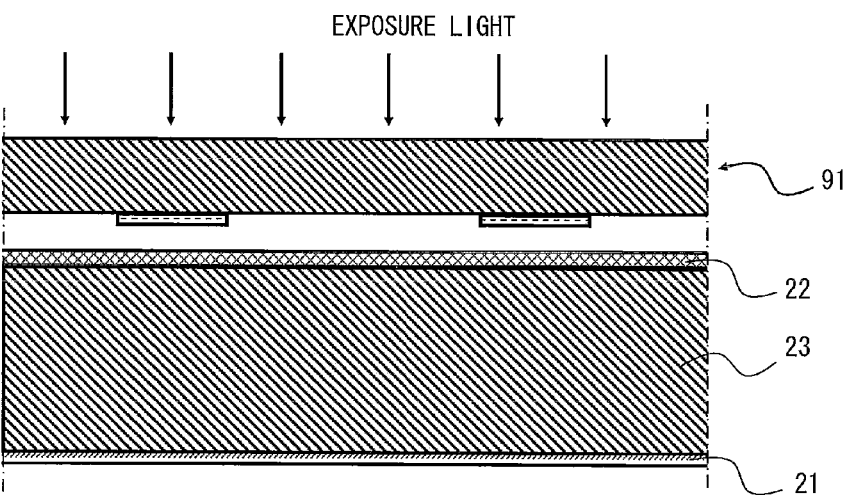

Then, as shown in FIG. 15C, exposure light is applied to the light shielding layer 22 through a photomask 91.

Figure 15D:
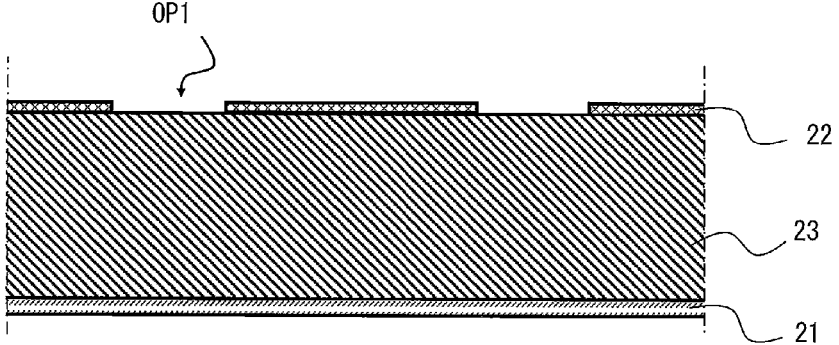

After that, as shown in FIG. 15D, a part that is not radiated with the exposure light is removed by a developer. The light shielding layer 22 is negative resist. Thus, a part that is radiated with the exposure light and changed in property remains, and a part that is not radiated with the exposure light is removed by the developer.

The optical function layer 20 is manufactured by the above procedure. The timing of forming the filter layer 21, however, may be after forming and patterning the light shielding layer 22.

In this embodiment, the transparent substrate 23 is placed between the light shielding layer 13 and the light shielding layer 22, thereby keeping the optical distance between the light shielding layer 13 and the light shielding layer 22. If the light shielding layer 22 or the light shielding layer 13 is formed to be thick, variation of the in-plane layer thickness can occur. If the thickness of the light shielding layer varies in a plane, the optical distance of the optical channel between each lens 32 and each pixel 14 varies in a plane, which causes deterioration of the quality of the image acquired in the image sensor 10. In this embodiment, the transparent substrate 23 with a uniform in-plane thickness is placed between the light shielding layer 13 and the light shielding layer 22, thereby preventing the optical length between the light shielding layer 13 and the light shielding layer 22 from varying largely in a plane.

Fourth Embodiment

Figure 16:
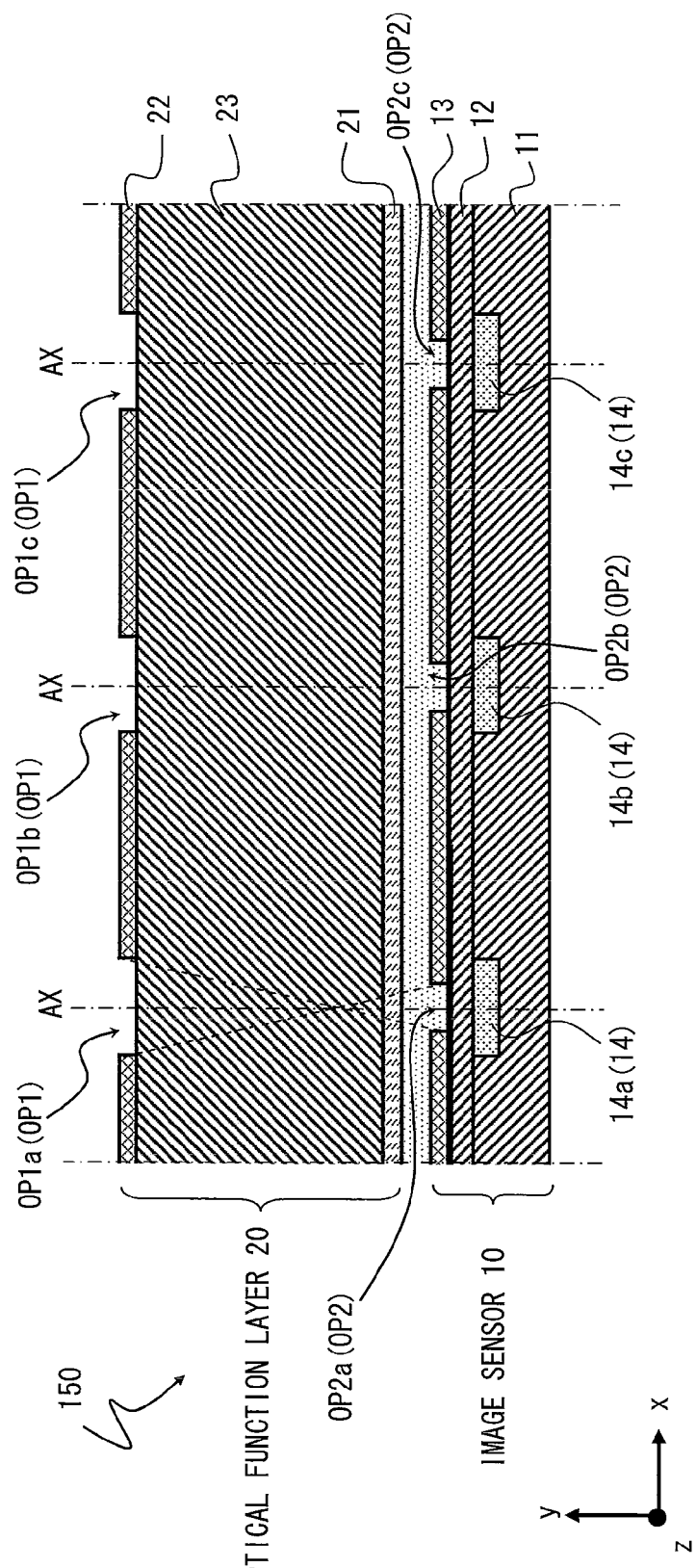
FIG. 16 is a schematic cross-sectional view of an image acquisition apparatus according to a fourth embodiment of the present invention.

A fourth embodiment of the present invention is described hereinafter with reference to FIG. 16. FIG. 16 is a schematic cross-sectional view of the image acquisition apparatus 150.

The image acquisition apparatus 150 according to this embodiment does not include the lens array substrate 30 and uses the light shielding layer 22 having the opening OP1 as a pinhole plate. In such a case also, the same advantage as in the above-described embodiments can be obtained. The light shielding layer 22 is provided with a light shielding function and an aperture function, so that it is possible to effectively promote slimming down of the image acquisition apparatus 150 and reduce the number of parts, thus achieving price-reduction of the image acquisition apparatus 150.

Fifth Embodiment

Figure 17:
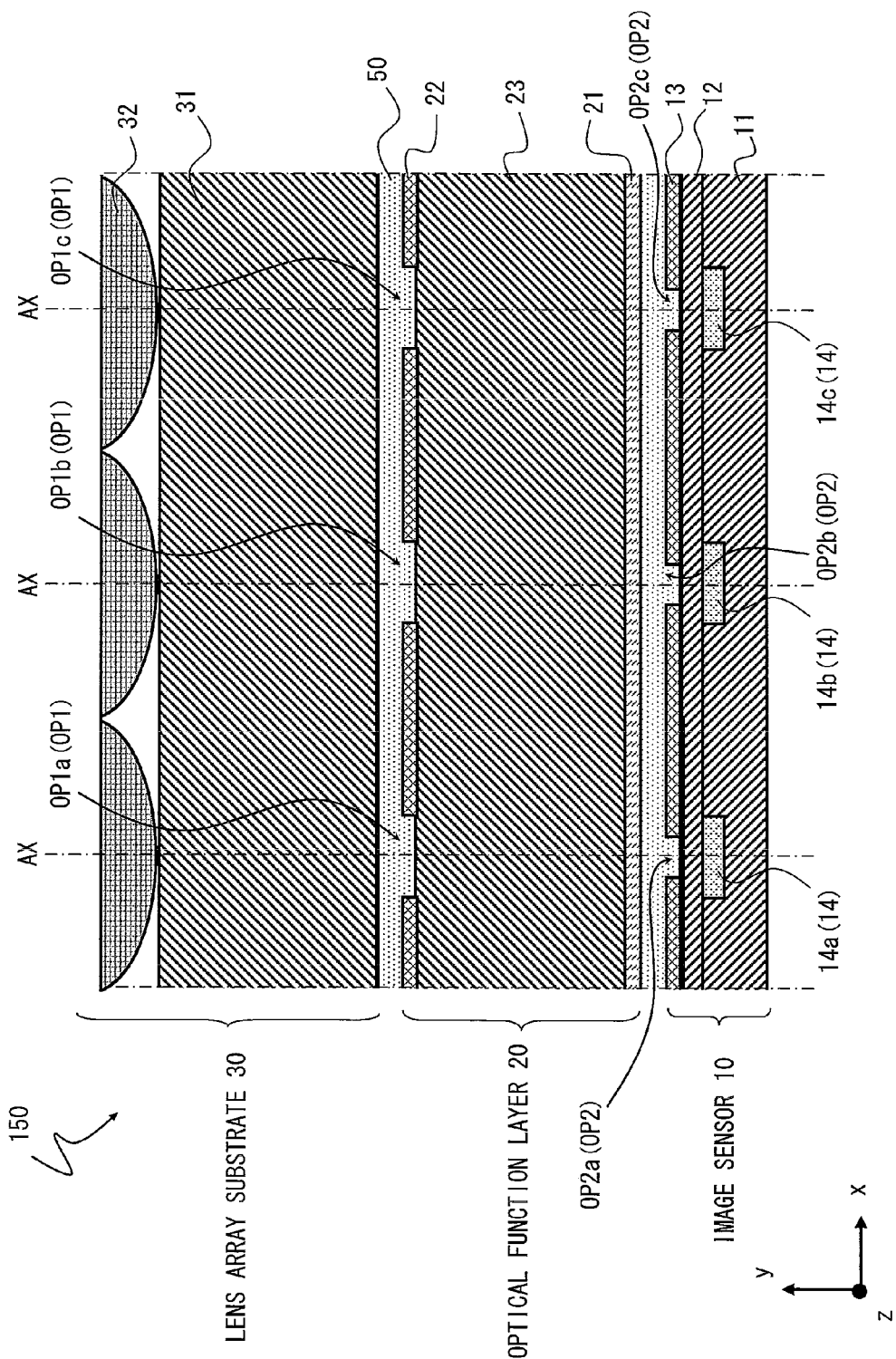
FIG. 17 is a schematic cross-sectional view of an image acquisition apparatus according to a fifth embodiment of the present invention.

A fifth embodiment of the present invention is described hereinafter with reference to FIG. 17. FIG. 17 is a schematic cross-sectional view of the image acquisition apparatus 150.

The image acquisition apparatus 150 according to this embodiment includes the lens array substrate 30 having a different structure from those described in the above embodiments. Specifically, the lens 32 placed on the transparent substrate 31 is convex to the image formation side (image sensor side). Thus, the lens 32 has a flat surface on the object side and a curved surface on the image formation side. The curved surface on the image formation side functions as a lens surface. In such a case also, the same advantage as in the above-described embodiments can be obtained.

Sixth Embodiment

Figure 18:
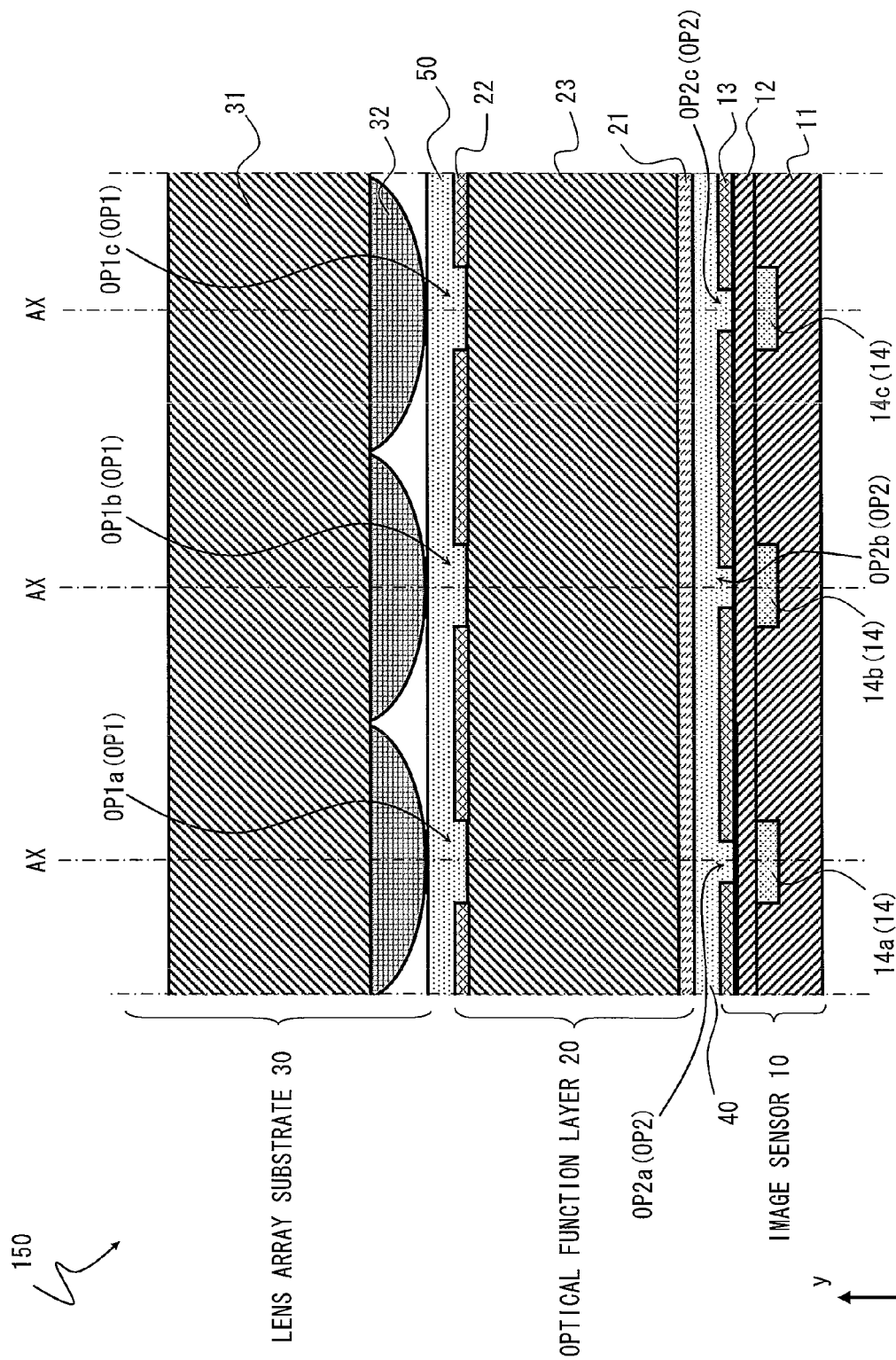
FIG. 18 is a schematic cross-sectional view of an image acquisition apparatus according to a sixth embodiment of the present invention.

A sixth embodiment of the present invention is described hereinafter with reference to FIG. 18. FIG. 18 is a schematic cross-sectional view of the image acquisition apparatus 150.

The image acquisition apparatus 150 according to this embodiment includes the lens array substrate 30 having a different structure from those described in the above embodiments. Specifically, the lens 32 is placed on the lower surface of the transparent substrate 31. The lens 32 is convex to the image formation side (image sensor side) as in the fifth embodiment. In such a case also, the same advantage as in the above-described embodiments can be obtained. The lens array substrate 30 is not necessarily bonded to the optical function layer 20.

Seventh Embodiment

Figure 19:
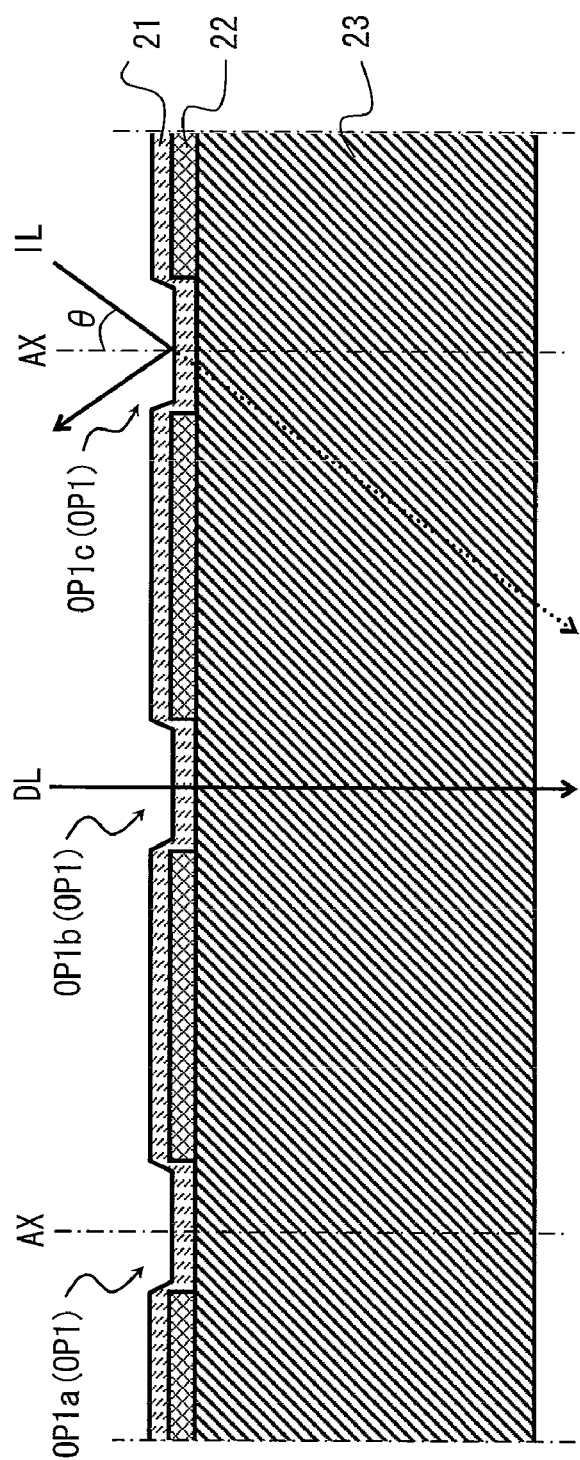
FIG. 19 is a schematic cross-sectional view of an optical function layer according to a seventh embodiment of the present invention.

A seventh embodiment of the present invention is described hereinafter with reference to FIG. 19. FIG. 19 is a schematic cross-sectional view of the optical function layer 20. The structure other than the optical function layer 20 is the same as that described in the above embodiments (this holds true for the following embodiments).

In this embodiment, the optical function layer 20 has the structure shown in FIG. 19. In such a case also, the same advantage as in the above-described embodiments can be obtained.

As shown in FIG. 19, the light shielding layer 22 is laminated on the transparent substrate 23. The filter layer 21 is laminated on the transparent substrate 23 and further on the light shielding layer 22. Specifically, the filter layer 21 is laminated directly on the transparent substrate 23 in the opening OP1 of the light shielding layer 22. In the area other than the opening OP1, the filter layer 21 is laminated on the light shielding layer 22.

A specific manufacturing method of the optical function layer 20 is arbitrary. For example, the optical function layer 20 may be manufactured by forming the light shielding layer 22 on transparent substrate 23, patterning the light shielding layer 22 and then forming the filter layer 21 on the transparent substrate 23.

As schematically shown in FIG. 19, a light ray DL that propagates in parallel with an optical axis AX passes through the filter layer 21 and the transparent substrate 23 in sequence toward the image sensor 10. A light ray IL that is e degrees with respect to the optical axis AX is reflected to the object side by the filtering action of the filter layer 21. By the filtering action of the filter layer 21, it is possible to effectively suppress the crosstalk and acquire a higher quality image.

The reflectance of the filter layer 21 for a light ray with an incident angle θ of 30 to 90 degrees is set to be five or more times (preferably, ten or more times) the reflectance of the filter layer 21 for a light ray with an incident angle θ of 0 to 10 degrees. By using the filter layer 21 having such properties, it is possible to effectively suppress the crosstalk and acquire a higher quality image.

In other words, the light transmittance of the filter layer 21 for a light ray with an incident angle θ of 0 to 10 degrees is set to be five or more times (preferably, ten or more times) the light transmittance of the filter layer 21 for a light ray with an incident angle θ of 30 to 90 degrees. By using the filter layer 21 having such properties, it is possible to effectively suppress the crosstalk and acquire a higher quality image.

In this embodiment, a light ray that is reflected by the interface between the transparent substrate 23 and the adhesive layer 40, the light shielding layer 13 or the like is absorbed by the light shielding layer 22. It is thereby possible to effectively suppress the occurrence of stray light and effectively reduce the crosstalk.

In this embodiment, the light shielding layer 22 and the filter layer 21 can be sequentially formed on one surface of the transparent substrate 23 as shown in FIG. 19, and there is thus no need to place the transparent substrate 23 upside down. It is thus possible to manufacture the optical function layer 20 easily without complicating the manufacturing process. This embodiment is the same as the above-described embodiments in that it employs a two-layer light shielding structure that can be made at low costs.

Eighth Embodiment

Figure 20:
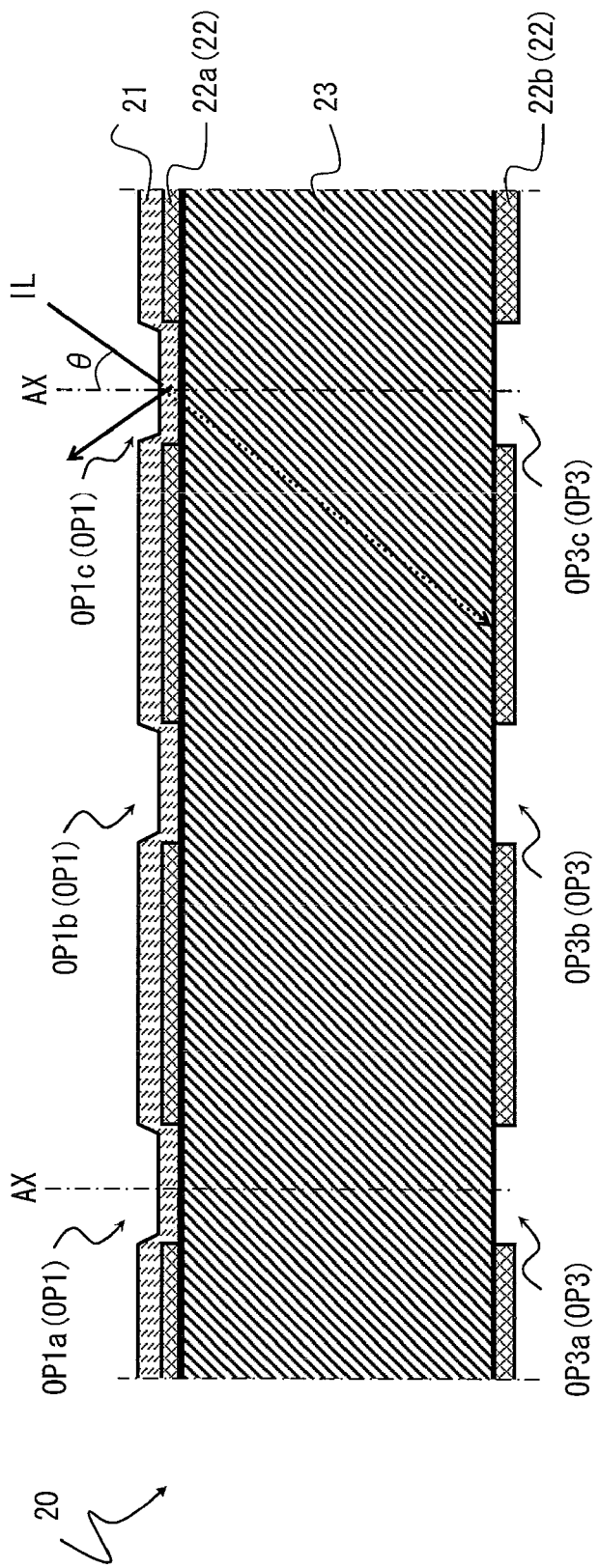
FIG. 20 is a schematic cross-sectional view of an optical function layer according to an eighth embodiment of the present invention.

An eighth embodiment of the present invention is described hereinafter with reference to FIG. 20. FIG. 20 is a schematic cross-sectional view of the optical function layer 20.

In this embodiment, the optical function layer 20 has the structure shown in FIG. 20. In such a case also, the same advantage as in the above-described embodiments can be obtained.

The optical function layer 20 according to this embodiment includes a light shielding layer 22b that is placed on the lower surface of the transparent substrate 23, in addition to the structure described in the seventh embodiment. A light component that has passed through the filter layer 21 is absorbed by the light shielding layer 22b on the lower surface of the transparent substrate 23. It is thereby possible to effectively suppress the occurrence of the crosstalk and stray light and acquire a higher quality image. Further, a light ray that is reflected by the lower surface of the transparent substrate 23 is absorbed by the light shielding layer 22a. It is thereby possible to effectively suppress the occurrence of stray light and acquire a higher quality image.

As shown in FIG. 20, a light shielding layer 22a is placed on the upper surface of the transparent substrate 23. The light shielding layer 22b is placed on the lower surface of the transparent substrate 23. A plurality of openings are made in a matrix in the light shielding layers 22a and 22b, corresponding to the pixels 14 arranged in a matrix. An opening OP1a made in the light shielding layer 22a and an opening OP3a made in the light shielding layer 22b are arranged on a common optical axis AX. This holds true for an opening OP1b and an opening OP3b, and an opening OP1c and an opening OP3c.

Further, in this embodiment, three light shielding layers (the light shielding layer 22a, the light shielding layer 22b and the light shielding layer 13) are formed in a layered structure with a space from one another along the optical axis AX. Specifically, the light shielding layers 22a and 22b are formed respectively on the upper surface and the lower surface of the transparent substrate 23, and the light shielding layer 13 is formed on the semiconductor substrate 11 by a normal thin film formation technique. By increasing the number of light shielding layers, it is possible to improve the light shielding property and acquire a higher quality image.

By forming the light shielding structure with a layered structure of light shielding layers each having a substantially uniform in-plane thickness, the thickness of each light shielding layer can be designed to be sufficiently small. It is thereby possible to form the light shielding layers without taking a long process time and further make openings easily in the light shielding layers. Because there is no need to form each light shielding layer to be thick, it is possible to suppress variation of the in-plane thickness of each light shielding layer. By suppressing variation of the in-plane thickness of each light shielding layer, it is possible to suppress the occurrence of partial unevenness in tone in an acquired image.

Ninth Embodiment

Figure 21:
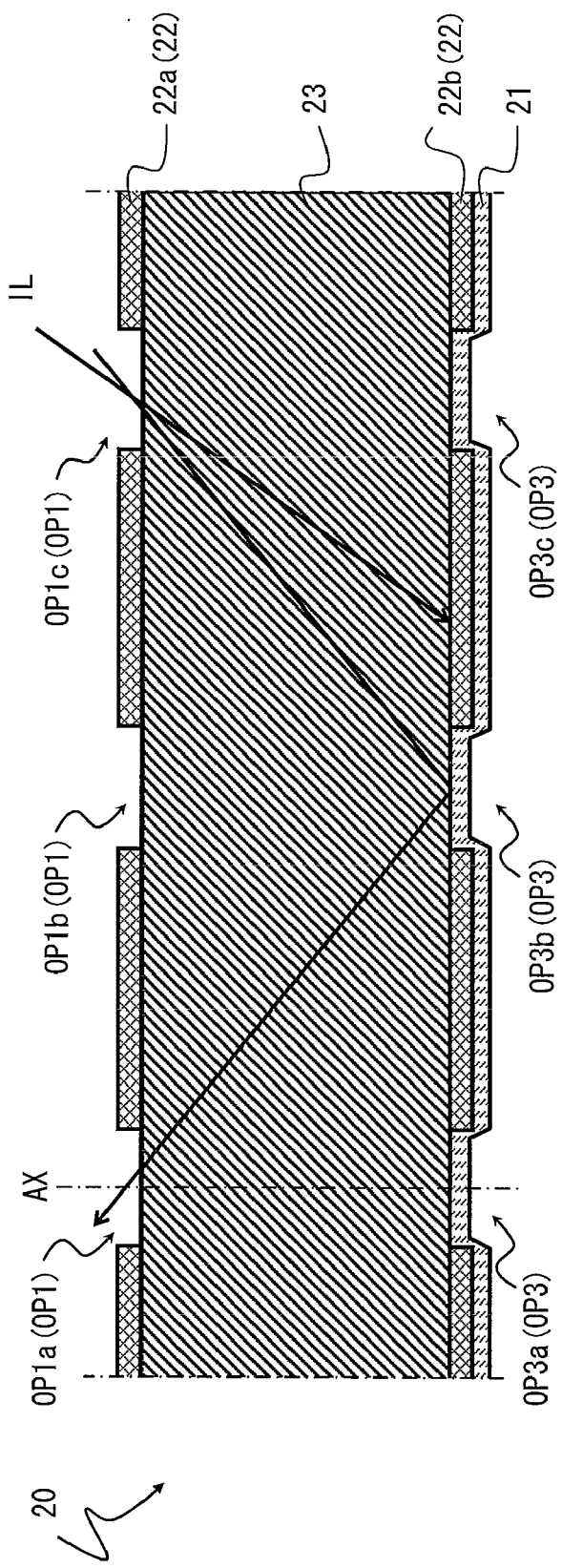
FIG. 21 is a schematic cross-sectional view of an optical function layer according to a ninth embodiment of the present invention.

A ninth embodiment of the present invention is described hereinafter with reference to FIG. 21. FIG. 21 is a schematic cross-sectional view of the optical function layer 20.

In this embodiment, the optical function layer 20 has the structure shown in FIG. 21. In such a case also, the same advantage as in the above-described embodiments can be obtained.

Specifically, in this embodiment, the filter layer 21 is placed on the lower surface of the transparent substrate 23, differently from the seventh and eighth embodiments. A light ray IL that is input to the transparent substrate 23 through the opening OP1c is absorbed by the light shielding layer 22b that is placed on the lower surface of the transparent substrate 23. A light ray reflected by the filter layer 21 is output to the object side through the opening OP1 of the light shielding layer 22. Alternatively, a light ray reflected by the filter layer 21 is absorbed by the light shielding layer 22a. It is thereby possible to effectively suppress the occurrence of the crosstalk and stray light and acquire a higher quality image.

Tenth Embodiment

Figure 22:
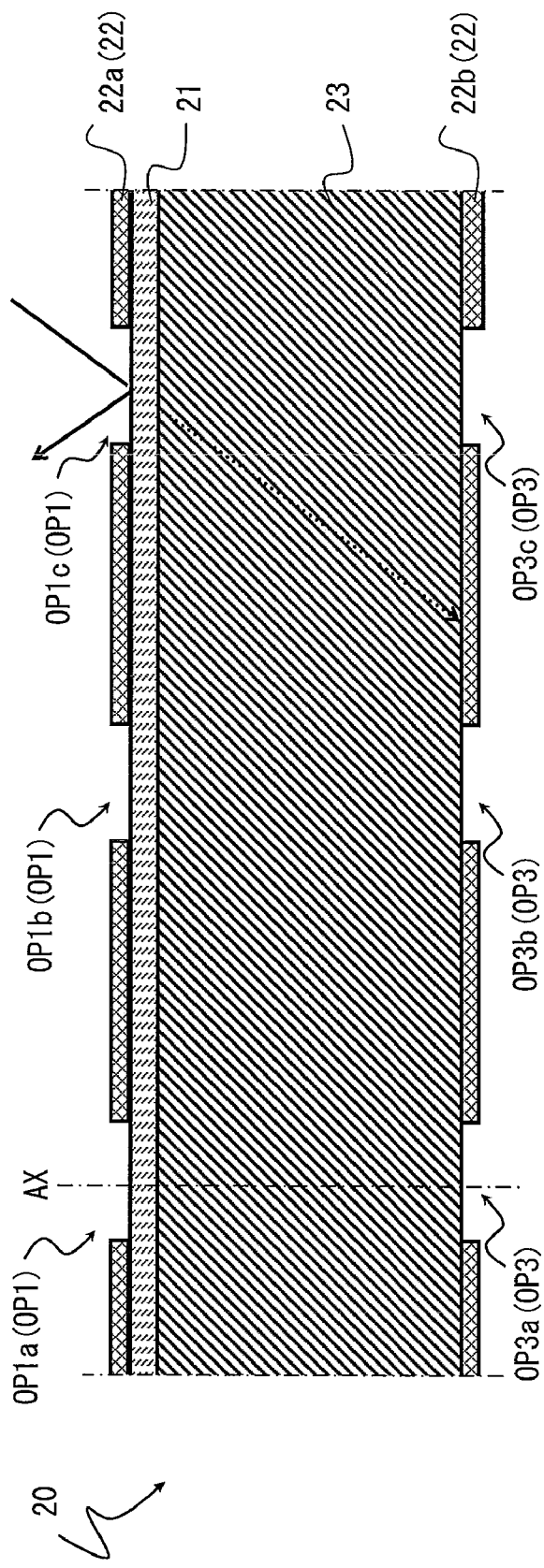
FIG. 22 is a schematic cross-sectional view of an optical function layer according to a tenth embodiment of the present invention.

A tenth embodiment of the present invention is described hereinafter with reference to FIG. 22. FIG. 22 is a schematic cross-sectional view of the optical function layer 20.

In this embodiment, the optical function layer 20 has the structure shown in FIG. 22. In such a case also, the same advantage as in the above-described embodiments can be obtained.

In the optical function layer 20 according to this embodiment, the filter layer 21 is placed between the transparent substrate 23 and the light shielding layer 22a. Specifically, the filter layer 21 is formed on the transparent substrate 23, and then the light shielding layer 22a is formed thereon. The component of a light ray IL that has passed through the filter layer 21 is absorbed by the light shielding layer 22b on the lower surface of the transparent substrate 23. It is thereby possible to effectively suppress the occurrence of the crosstalk and stray light and acquire a higher quality image. As shown in FIG. 22, the filter layer 21 is formed on the upper surface of the transparent substrate 23. The light shielding layer 22a is formed on the filter layer 21. The light shielding layer 22a is patterned on the filter layer 21.

Eleventh Embodiment

Figure 23:
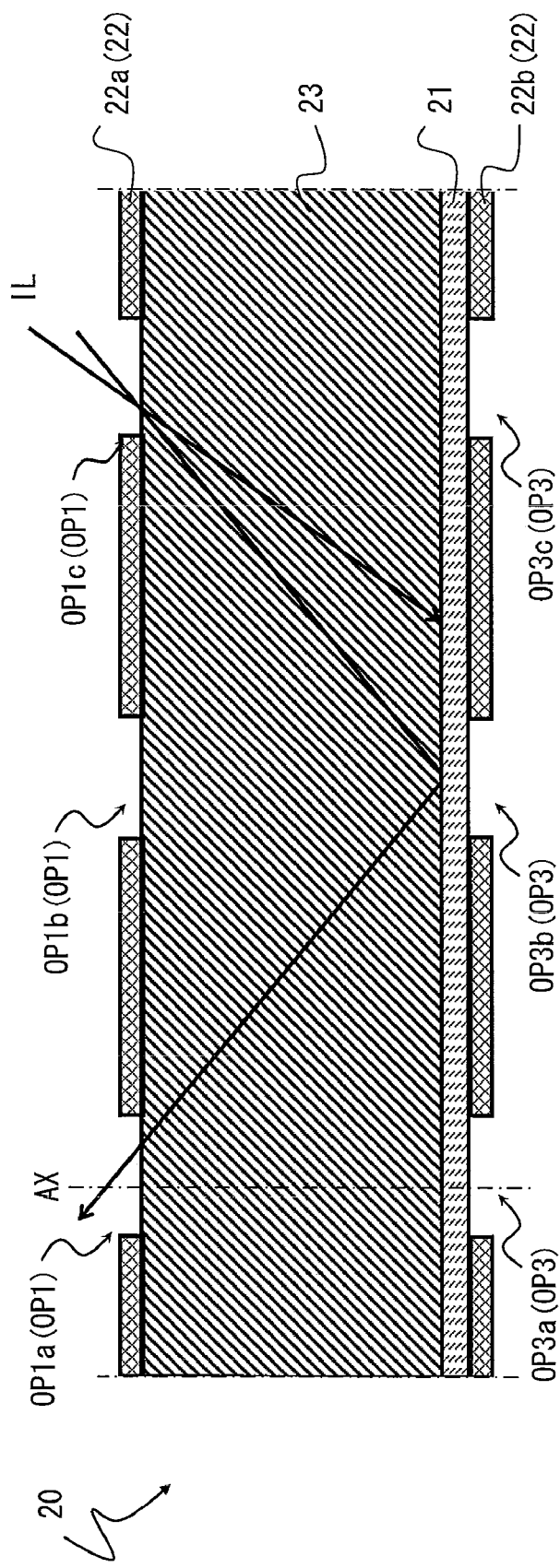
FIG. 23 is a schematic cross-sectional view of an optical function layer according to an eleventh embodiment of the present invention.

An eleventh embodiment of the present invention is described hereinafter with reference to FIG. 23. FIG. 23 is a schematic cross-sectional view of the optical function layer 20.

In this embodiment, the optical function layer 20 has the structure shown in FIG. 23. In such a case also, the same advantage as in the above-described embodiments can be obtained.

In the optical function layer 20 according to this embodiment, the filter layer 21 is placed between the transparent substrate 23 and the light shielding layer 22b. Specifically, the filter layer 21 is formed on the transparent substrate 23, and then the light shielding layer 22b is formed thereon. A light ray IL that is reflected by the filter layer 21 is output to the object side through the opening OP1. Alternatively, a light ray IL that is reflected by the filter layer 21 is absorbed by the light shielding layer 22a. A light component that has passed through the filter layer 21 is absorbed by the light shielding layer 22b on the filter layer 21. It is thereby possible to effectively suppress the occurrence of the crosstalk and stray light and acquire a higher quality image. As shown in FIG. 23, the filter layer 21 is formed on the lower surface of the transparent substrate 23. The light shielding layer 22b is formed on the filter layer 21. The light shielding layer 22b is patterned on the filter layer 21.

The technological range of the present invention is not limited to the above-described embodiment. A specific structure of the filter layer is arbitrary. It is not necessary to place the filter layer on the optical axis of the lens. Use of the optical component is not limited to the above-described embodiment. Further, use of the image acquisition apparatus is not limited to the above-described embodiment. Biometric information different from a vein image is also applicable. Materials of the substrate, the lens and so on are arbitrary. The wiring layer 12 may be transparent to incident light (infrared ray), or designed in such a way that no wire exists on the pixel 14. In the case of using the light shielding wire, the wiring layer 12 may function as the light shielding layer 13 by not covering the pixel 14 with any wire. An optical device such as a wavelength-selective filter or a protective plate may be placed on the lens array substrate 30. The above-described embodiments are not independent of one another and can be combined as desirable. The effects by the combination of the embodiments are also entirely comprehensible as a matter of course.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An image acquisition apparatus comprising:
    an image pickup device that includes a plurality of pixels;
    a filter layer that blocks propagation of an incident light ray which comes from an object side to the pixel side in accordance with an increase in incident angle of the incident light ray;
    a first light shielding layer that has a plurality of openings corresponding to the plurality of pixels, wherein
    the filter layer blocks propagation of the incident light ray which comes from the object side to the pixel side through the openings in accordance with an increase in incident angle of the light ray.

2. The image acquisition apparatus according to claim 1, further comprising:
    a transparent substrate that supports at least one of the filter layer and the first light shielding layer.

3. The image acquisition apparatus according to claim 2, further comprising:
    a lens array substrate that includes a plurality of lenses corresponding to the plurality of pixels.

4. The image acquisition apparatus according to claim 3, further comprising:
    a second light shielding layer that has a plurality of openings corresponding to the plurality of pixels, wherein
    the second light shielding layer is placed immediately above the image pickup device.

5. The image acquisition apparatus according to claim 4, wherein the second light shielding layer is formed by a wiring layer of the image pickup device.

6. The image acquisition apparatus according to claim 5, wherein the filter layer and the first light shielding layer are placed on the transparent substrate.

7. The image acquisition apparatus according to claim 6, wherein each thickness of the first light shielding layer and the second light shielding layer is substantially uniform in a plane.

8. The image acquisition apparatus according to claim 7, further comprising:
    a third light shielding layer that has a plurality of openings corresponding to the plurality of pixels, wherein
    the third light shielding layer is placed between the first light shielding layer and the second light shielding layer with a given space from the first light shielding layer and the second light shielding layer.

9. The image acquisition apparatus according to claim 8, wherein a thickness of the third light shielding layer is substantially uniform in a plane.

10. The image acquisition apparatus according to claim 9, wherein each thickness of the first light shielding layer, the second light shielding layer and the third light shielding layer is smaller than a thickness of the transparent substrate.

11. A biometric information acquisition apparatus for acquiring biometric information of a test body, comprising:
    a light source;
    an image pickup device that picks up a vein image of the test body by receiving light that is emitted from the light source and made incident on a plurality of pixels thereof through the test body;
    a filter layer that blocks propagation of an incident light ray that comes from the test body side to the pixel side in accordance with an increase in incident angle of the incident light ray; and
    a first light shielding layer that has a plurality of openings corresponding to the plurality of pixels, wherein
    the filter layer blocks propagation of the incident light ray that comes from the test body side to the pixel side through the openings in accordance with an increase in incident angle of the incident light ray.

12. The biometric information acquisition apparatus according to claim 11, further comprising:
    a transparent substrate that supports at least one of the filter layer and the first light shielding layer; and
    a lens array substrate that includes a plurality of lenses corresponding to the plurality of pixels.

13. The biometric information acquisition apparatus according to claim 12, further comprising:
    a second light shielding layer that has a plurality of openings corresponding to the plurality of pixels, wherein
    the second light shielding layer is placed immediately above the image pickup device.

14. An image acquisition apparatus comprising:
    an image pickup means that picks up an image by receiving incident light with a plurality of pixels;
    a filter means that blocks propagation of an incident light ray that comes from an object side to the pixel side in accordance with an increase in incident angle of the incident light ray; and
    a first light shielding means that has a plurality of openings corresponding to the plurality of pixels, wherein
    the filter means blocks propagation of the incident light ray which comes from the object side to the pixel side through the openings in accordance with an increase in incident angle of the light ray.

* * * * *